US011427229B2

(12) United States Patent
Beckman et al.

(10) Patent No.: US 11,427,229 B2
(45) Date of Patent: Aug. 30, 2022

(54) DEMAND-BASED DISTRIBUTION OF ITEMS USING INTERMODAL CARRIERS AND UNMANNED AERIAL VEHICLES

(71) Applicant: Amazon Technologies, Inc., Seattle, WA (US)

(72) Inventors: Brian C. Beckman, Newcastle, WA (US); Nicholas Bjone, Laveen, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 16/883,941

(22) Filed: May 26, 2020

(65) Prior Publication Data

US 2020/0283032 A1    Sep. 10, 2020

Related U.S. Application Data

(60) Continuation of application No. 16/515,681, filed on Jul. 18, 2019, now Pat. No. 10,676,107, which is a
(Continued)

(51) Int. Cl.
*B61D 3/16*    (2006.01)
*B25J 9/16*    (2006.01)
(Continued)

(52) U.S. Cl.
CPC .............. *B61D 3/16* (2013.01); *B25J 9/1679* (2013.01); *B25J 11/00* (2013.01); *B61D 3/18* (2013.01);
(Continued)

(58) Field of Classification Search
CPC ...................................................... B61D 3/16
See application file for complete search history.

(56) References Cited

U.S. PATENT DOCUMENTS 8,732,039 B1 *   5/2014   Chen .................... G06Q 10/063
                                                            705/26.81
8,956,100 B2    2/2015   Davi et al.
(Continued)

FOREIGN PATENT DOCUMENTS

CN          106143941 A       11/2016
CN          106203900 A       12/2016
(Continued)

OTHER PUBLICATIONS

Search Report dated Jun. 18, 2020, from corresponding application No. CN 201880018416.2.
(Continued)

*Primary Examiner* — Thomas Randazzo
(74) *Attorney, Agent, or Firm* — Athorus, PLLC

(57) ABSTRACT

Intermodal vehicles may be loaded with items and an aerial vehicle, and directed to travel to areas where demand for the items is known or anticipated. The intermodal vehicles may be coupled to locomotives, container ships, road tractors or other vehicles, and equipped with systems for loading one or more items onto the aerial vehicle, and for launching or retrieving the aerial vehicle while the intermodal vehicles are in motion. The areas where the demand is known or anticipated may be identified on any basis, including but not limited to past histories of purchases or deliveries to such areas, or events that are scheduled to occur in such areas. Additionally, intermodal vehicles may be loaded with replacement parts and/or inspection equipment, and configured to conduct repairs, servicing operations or inspections on aerial vehicles within the intermodal vehicles, while the intermodal vehicles are in motion.

20 Claims, 23 Drawing Sheets

Related U.S. Application Data division of application No. 15/461,006, filed on Mar. 16, 2017, now Pat. No. 10,384,692.

(51) Int. Cl.

| | |
|---|---|
| *G06Q 10/08* | (2012.01) |
| *B65G 1/137* | (2006.01) |
| *B61L 25/02* | (2006.01) |
| *B65G 1/04* | (2006.01) |
| *G06Q 30/02* | (2012.01) |
| *B25J 11/00* | (2006.01) |
| *B61L 15/00* | (2006.01) |
| *B61D 3/18* | (2006.01) |
| *B61L 27/14* | (2022.01) |
| *B61D 39/00* | (2006.01) |

(52) U.S. Cl.
CPC ........ *B61D 39/006* (2013.01); *B61L 15/0081* (2013.01); *B61L 25/025* (2013.01); *B61L 27/14* (2022.01); *B65G 1/0464* (2013.01); *B65G 1/1373* (2013.01); *G06Q 10/083* (2013.01); *G06Q 30/0202* (2013.01); *G06Q 30/0205* (2013.01); *B61L 25/021* (2013.01); *B64C 2201/00* (2013.01); *B64C 2201/12* (2013.01); *B64C 2201/128* (2013.01)

(56) References Cited

U.S. PATENT DOCUMENTS

| | | | |
|---|---|---|---|
| 9,033,285 B2 | 5/2015 | Iden et al. | |
| 9,139,310 B1 | 9/2015 | Wang | |
| 9,244,147 B1 | 1/2016 | Soundararajan et al. | |
| 9,434,267 B2 | 9/2016 | Wang et al. | |
| 9,481,458 B2 | 11/2016 | Magaña et al. | |
| 9,494,937 B2 | 11/2016 | Siegel et al. | |
| 9,545,852 B2 | 1/2017 | Streett | |
| 9,623,760 B2 | 4/2017 | Wang et al. | |
| 9,718,564 B1* | 8/2017 | Beckman | B61L 23/00 |
| 10,013,886 B2 | 7/2018 | Blomberg et al. | |
| 10,029,787 B1* | 7/2018 | Lesser | G06Q 10/0833 |
| 10,163,069 B2 | 12/2018 | Borley et al. | |
| 2002/0123930 A1 | 9/2002 | Boyd et al. | |
| 2005/0060164 A1* | 3/2005 | Eli Berl Illion | G06Q 10/08 705/28 |
| 2006/0136237 A1* | 6/2006 | Spiegel | G06Q 10/0835 705/13 |
| 2006/0288902 A1* | 12/2006 | McGuire | B61F 1/00 105/215.2 |
| 2007/0016496 A1 | 1/2007 | Bar et al. | |
| 2007/0293978 A1 | 12/2007 | Wurman et al. | |
| 2008/0154659 A1 | 6/2008 | Bettes et al. | |
| 2008/0167817 A1 | 7/2008 | Hessler et al. | |
| 2008/0301009 A1 | 12/2008 | Plaster et al. | |
| 2010/0070342 A1* | 3/2010 | Hu | G06Q 30/02 707/769 |
| 2012/0030133 A1* | 2/2012 | Rademaker | G06Q 10/08 705/333 |
| 2012/0219397 A1 | 8/2012 | Baker | |
| 2013/0073477 A1 | 3/2013 | Grinberg | |
| 2013/0218799 A1 | 8/2013 | Lehmann et al. | |
| 2013/0261792 A1 | 10/2013 | Gupta et al. | |
| 2014/0032034 A1* | 1/2014 | Raptopoulos | H04B 7/18506 701/25 |
| 2014/0136282 A1 | 5/2014 | Fedele | |
| 2015/0102154 A1 | 4/2015 | Duncan et al. | |
| 2015/0317597 A1* | 11/2015 | Shucker | G06Q 10/083 235/375 |
| 2015/0332206 A1* | 11/2015 | Trew | G06Q 10/0836 705/330 |
| 2015/0370251 A1 | 12/2015 | Siegel et al. | |
| 2016/0114488 A1 | 4/2016 | Medina et al. | |
| 2016/0137404 A1* | 5/2016 | Steiner | B61D 9/14 220/1.5 |
| 2016/0144734 A1 | 5/2016 | Wang et al. | |
| 2016/0185466 A1* | 6/2016 | Dreano, Jr. | G06Q 10/083 705/26.81 |
| 2016/0257401 A1* | 9/2016 | Buchmueller | G06Q 10/047 |
| 2016/0266578 A1 | 9/2016 | Douglas et al. | |
| 2016/0266579 A1 | 9/2016 | Chen et al. | |
| 2016/0292798 A1* | 10/2016 | Berry | G06Q 30/06 |
| 2016/0300174 A1* | 10/2016 | Grichnik | G06Q 10/0637 |
| 2016/0307155 A1* | 10/2016 | Bell | G06Q 10/08 |
| 2016/0364678 A1* | 12/2016 | Cao | G06Q 10/083 |
| 2016/0364989 A1* | 12/2016 | Speasl | B64C 39/024 |
| 2017/0011333 A1* | 1/2017 | Greiner | G06K 7/10722 |
| 2017/0038780 A1* | 2/2017 | Fandetti | G06Q 10/083 |
| 2017/0096222 A1* | 4/2017 | Spinelli | B64C 33/00 |
| 2017/0098378 A1* | 4/2017 | Soundararajan | A47G 29/14 |
| 2017/0101017 A1 | 4/2017 | Streett | |
| 2017/0129352 A1 | 5/2017 | Lin et al. | |
| 2017/0174091 A1 | 6/2017 | Miller et al. | |
| 2017/0190260 A1 | 7/2017 | Wang et al. | |
| 2017/0263131 A1* | 9/2017 | Blomberg | G08G 5/0039 |
| 2017/0293884 A1* | 10/2017 | Cheatham, III | G01B 21/02 |
| 2017/0313421 A1* | 11/2017 | Gil | G06Q 10/0832 |
| 2017/0323257 A1* | 11/2017 | Cheatham, III | B64C 39/024 |
| 2017/0352003 A1* | 12/2017 | Bertoli | G06Q 10/04 |
| 2018/0069650 A1* | 3/2018 | Tran | H04K 3/68 |
| 2018/0121876 A1* | 5/2018 | Doherty | G05D 1/0044 |
| 2018/0130008 A1 | 5/2018 | Liu | |
| 2018/0150798 A1* | 5/2018 | Wilkinson | G06Q 10/08355 |
| 2018/0189725 A1* | 7/2018 | Mattingly | G06K 19/0723 |
| 2018/0268428 A1* | 9/2018 | Shariff | G06Q 30/0205 |
| 2019/0012631 A1 | 1/2019 | Chatani | |
| 2019/0161190 A1 | 5/2019 | Gil et al. | |
| 2019/0220819 A1 | 7/2019 | Banvait et al. | |
| 2019/0347614 A1 | 11/2019 | Khasis | |

FOREIGN PATENT DOCUMENTS

| | | |
|---|---|---|
| CN | 106503954 A | 3/2017 |
| EP | 1626537 A1 | 2/2006 |
| JP | 2001156929 A | 6/2001 |
| JP | 2001359200 A | 12/2001 |
| JP | 2008066992 A | 3/2008 |
| JP | 2008524714 A | 7/2008 |
| JP | 2014175747 A | 9/2014 |
| JP | 2016531797 A | 10/2016 |

OTHER PUBLICATIONS

Anonymous: "UPS has a Delivery Truck That Can launch a Drone," The Verge, Feb. 21, 2017, Retrieved from the Internet on May 2, 2018, URL: https://www.theverge.com/2017/2/21/14691062/ups-drone-delivery-truck-test-completed-video, pp. 1-3.

International Search Report for PCT/US2018/020497, dated Jul. 31, 2018.

Partial International Search Report for PCT/US2018/020497, dated May 14, 2018.

* cited by examiner

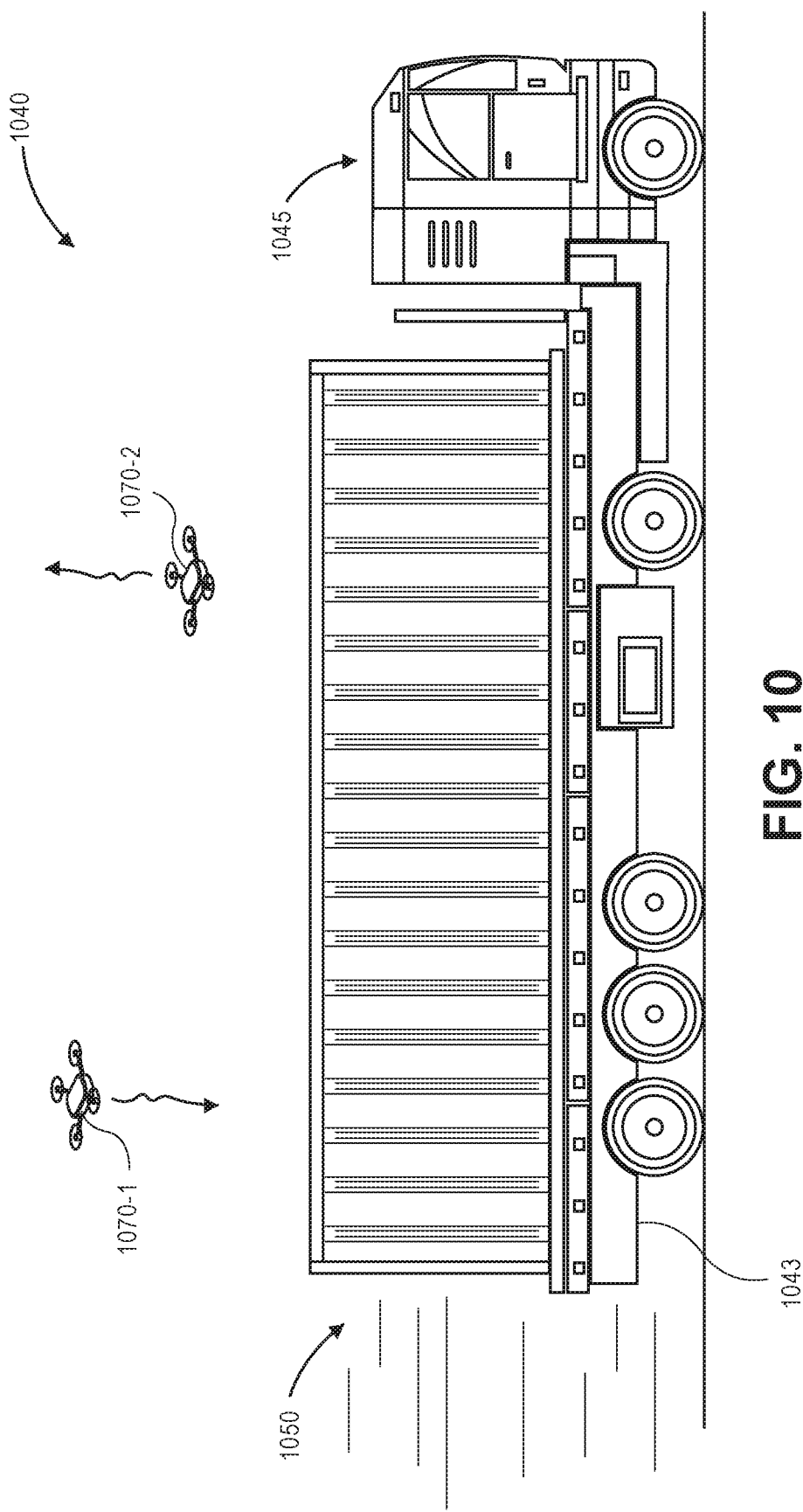

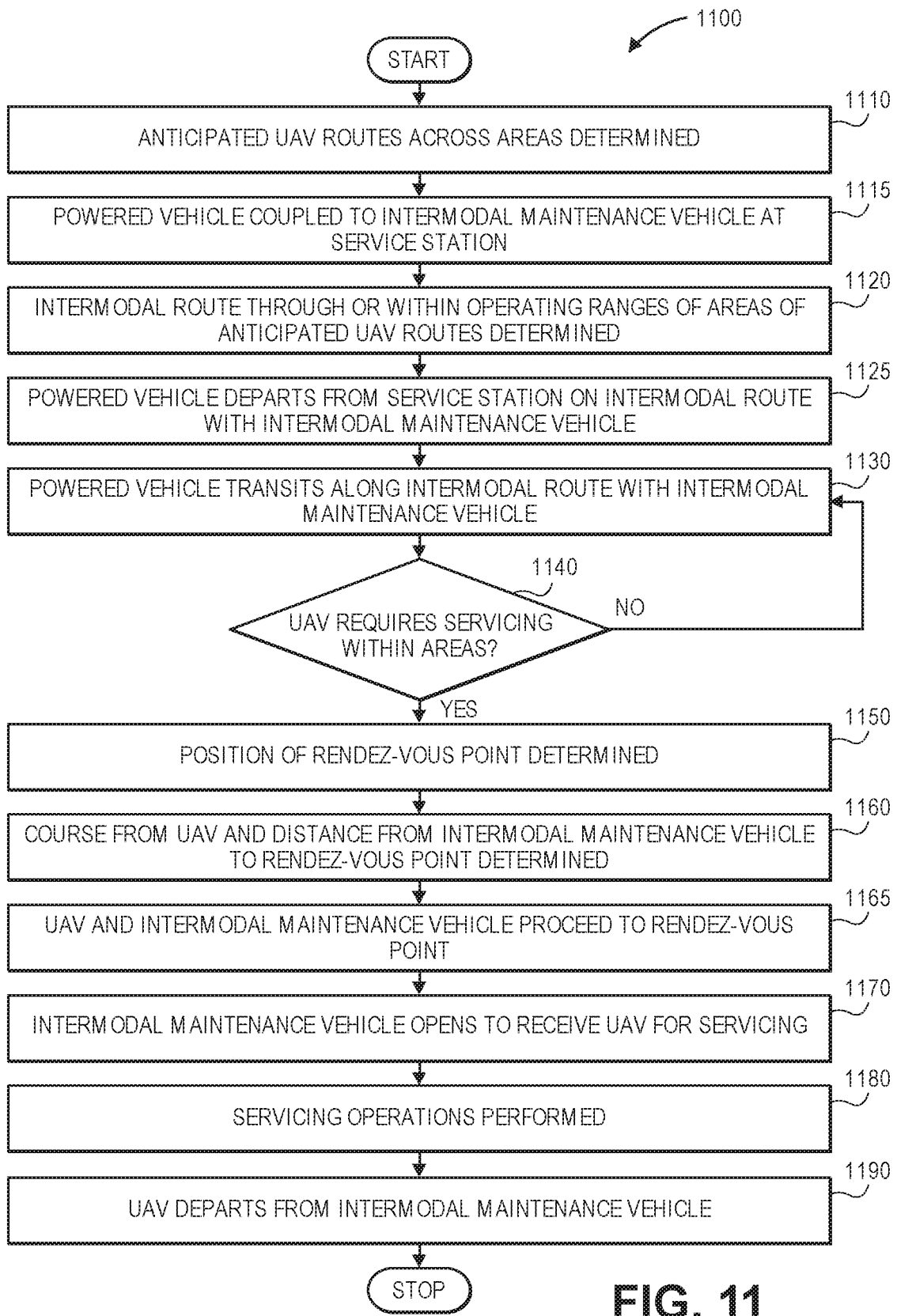

DEMAND-BASED DISTRIBUTION OF ITEMS USING INTERMODAL CARRIERS AND UNMANNED AERIAL VEHICLES

CROSS-REFERENCE TO RELATED APPLICATIONS

This application is a continuation of U.S. patent application Ser. No. 16/515,681, filed Jul. 18, 2019, which is a division of U.S. patent application Ser. No. 15/461,006, now U.S. Pat. No. 10,384,692, filed Mar. 16, 2017. The contents of each of these applications are incorporated by reference herein in their entireties.

BACKGROUND

Online marketplaces enable customers to visit one or more network sites from any corner of the globe, to view and evaluate items, and to place orders for the purchase of such items over the Internet. Initially, orders for items that were placed at online marketplaces over the Internet were fulfilled at the original locations of vendors (or manufacturers, merchants or other sources of the items), from which the items would be shipped to customers via first-class mail or another common carrier. Today, however, many online marketplaces operate in association with one or more fulfillment centers. A fulfillment center is a facility, a warehouse or another like structure that is constructed in a distributed, centralized location and adapted to receive items from sources of the items (e.g., vendors or other fulfillment centers). Fulfillment centers may include stations for receiving shipments of items, for storing such items, and/or for preparing such items for delivery to customers. When an order for the purchase of one or more items stored in a fulfillment center is received from a customer, the ordered items may be retrieved from spaces or areas in which such items are stored, and prepared for delivery to the customer, e.g., by packing the ordered items into one or more appropriate containers with a sufficient type and amount of dunnage, and delivering the containers to a destination designated by the customer.

Aerial vehicles such as airplanes or helicopters are commonly used to transport people or cargo from an origin to one or more destinations by air. Additionally, loading passengers or cargo onto an aerial vehicle at an origin, and unloading passengers or cargo from the aerial vehicle at a destination, typically requires the use and support of one or more machines, buildings, facilities and/or structures, as well as the assistance of numerous personnel. For this reason, aerial vehicles typically depart from and return to immovable facilities or structures such as airports, helipads, heliports, jetports or the like, which may, like fulfillment centers, occupy substantially large areas or include one or more large buildings and connections to various transportation systems. For example, Denver International Airport occupies a land area that is more than twice the size of New York's Manhattan Island.

Moreover, performing planned or unplanned maintenance on an aerial vehicle requires the aerial vehicle to be taken out of service for extended durations. For example, depending on its size, or a length of time since its most recent inspection, a typical inspection of an aerial vehicle may require tens or hundreds of man-hours in order to be completed. Even where maintenance results in a determination that the integrity of an aerial vehicle is sound, and that the aerial vehicle is operating in a safe and satisfactory manner, or that the aerial vehicle requires a simple repair, the aerial vehicle must still be taken out of service in order to arrive at that determination, or to complete the repair. Every hour in which an aerial vehicle is out-of-service is an hour in which the aerial vehicle is not providing value.

BRIEF DESCRIPTION OF THE DRAWINGS

FIGS. 1A through 1L are views of aspects of operation of one mobile intermodal delivery system in accordance with embodiments of the present disclosure.

FIG. 10 is a view of aspects of operation of one mobile intermodal delivery system in accordance with embodiments of the present disclosure.

DETAILED DESCRIPTION

Figure 1A:
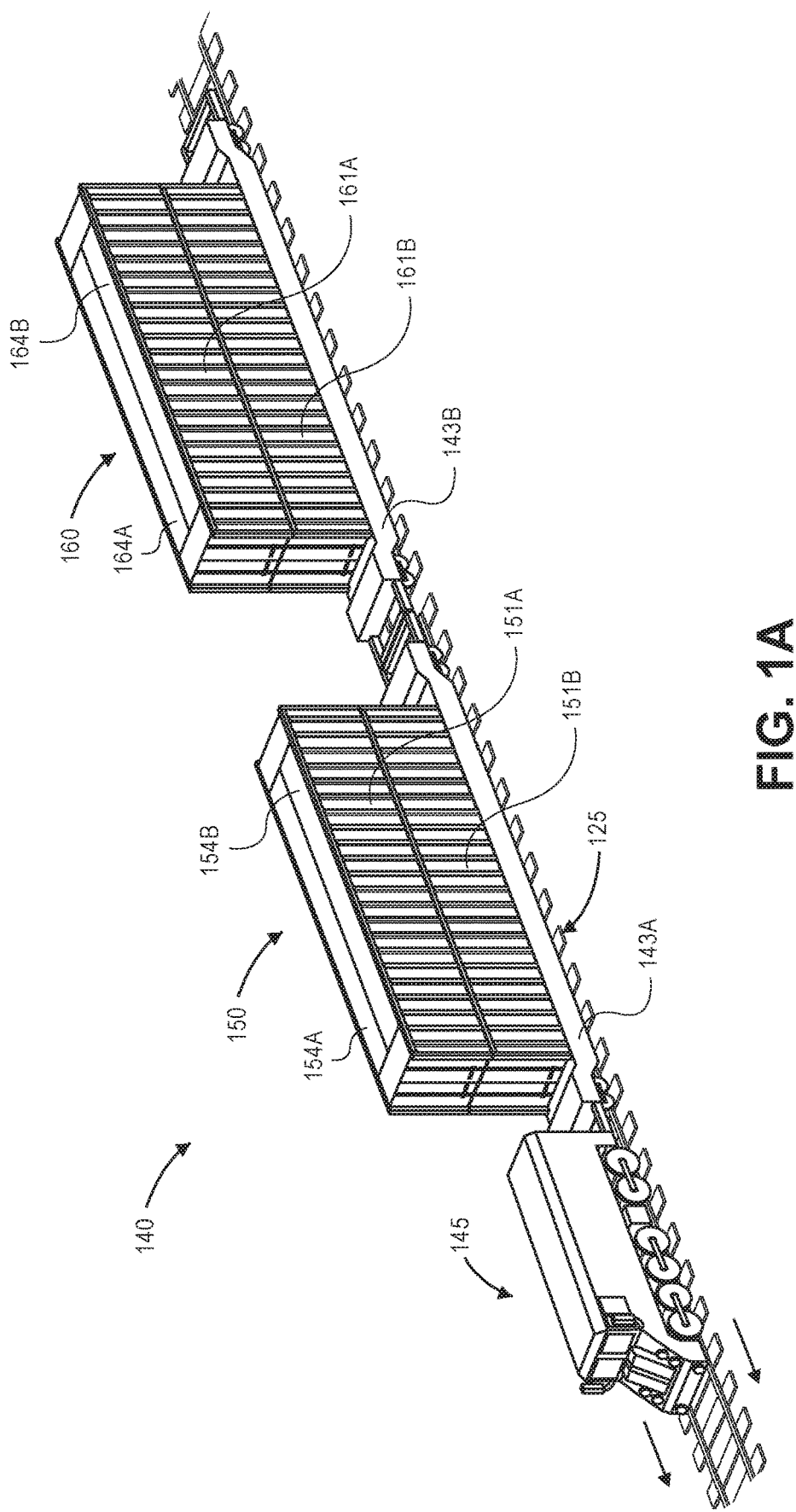

As is set forth in greater detail below, the present disclosure is directed to the use of mobile intermodal delivery systems in combination with one or more aerial vehicles such as unmanned aerial vehicles (e.g., "UAV"), or drones. In particular, some embodiments of the present disclosure are directed to the fulfillment of orders for items using aerial vehicles that are launched from mobile intermodal carriers, including but not limited to intermodal carriers that are loaded onto well cars or like cars that are pushed or pulled on rails by locomotives, as well as intermodal carriers that are carried on container ships traveling on waterways and/or tractor-trailers traveling on suitable roads (e.g., highways having sufficient vertical and lateral clearance). The intermodal carriers may be constructed in any manner, and from any materials. For example, in some embodiments, an intermodal carrier may be formed from two or more prefabricated or preconstructed intermodal containers of standard dimensions or shapes that may be stacked atop or otherwise associated with one another.

Some other embodiments of the present disclosure are directed to the forward deployment of inventory to regions of predicted demand using mobile intermodal carriers (e.g., carriers placed in motion by locomotives, seagoing vessels and/or road vehicles) for delivery by UAVs. Some other embodiments of the present disclosure are also directed to mobile maintenance facilities within mobile intermodal carriers that are configured to receive one or more UAVs that require maintenance, repairs or other servicing operations, and to automatically perform such operations within the intermodal carriers before launching the UAVs therefrom, thereby promptly restoring the UAVs to an operational state without requiring the UAV to return to a fixed structure or other facility for the performance of such operations.

Referring to FIGS. 1A through 1L, a mobile intermodal delivery system 140 is shown. The mobile intermodal delivery system 140 includes a powered vehicle 145 (e.g., a locomotive) as well as an intermodal carrier vehicle 150 and an intermodal maintenance vehicle 160 traveling on a set of rails 125. The intermodal carrier vehicle 150 is formed from a pair of intermodal containers 151A, 151B that are stacked atop one another and placed on a well car 143A that is coupled to the powered vehicle 145. The intermodal container 151A, which is stacked atop the intermodal container 151B on the well car 143A, includes a pair of top doors 154A, 154B that may be hingedly opened or closed to provide access to the intermodal carrier vehicle 150 from above. The intermodal maintenance vehicle 160 is also formed from a pair of intermodal containers 161A, 161B that are stacked atop one another and placed on the well car 143B that is coupled to the powered vehicle 145 via the intermodal carrier vehicle 150. The intermodal container 161A, which is stacked atop the intermodal container 161B on the well car 143B, also includes a pair of top doors 164A, 164B that may be hingedly opened or closed to provide access to the intermodal maintenance vehicle 160 from above.

Figure 1B:
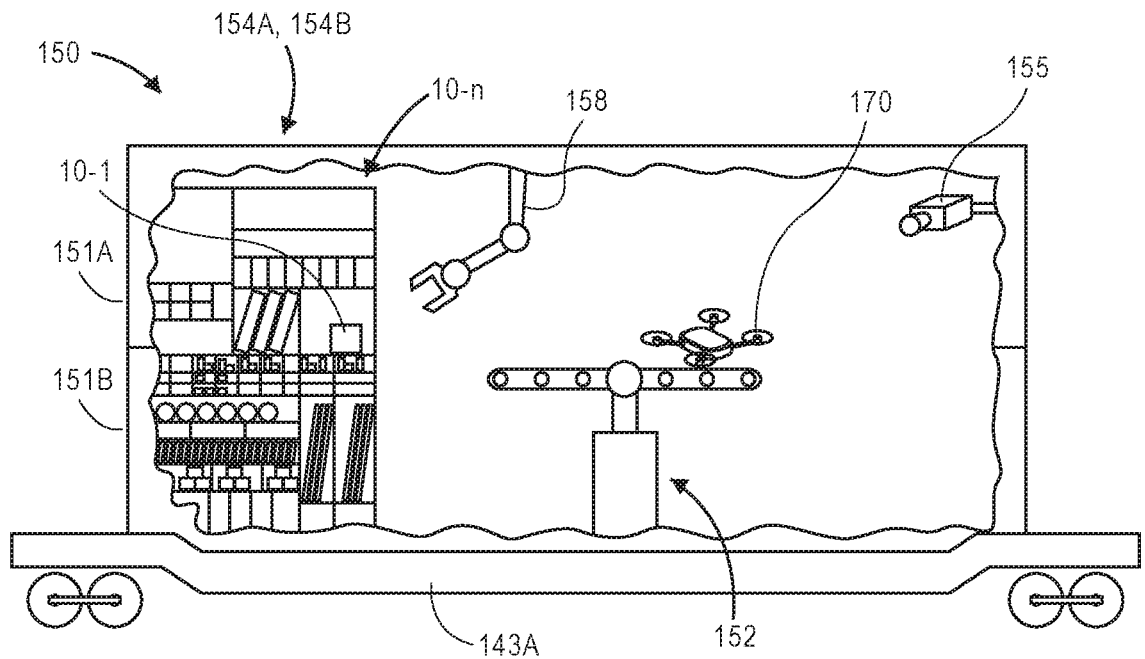

FIG. 1B is a cutaway view of the intermodal carrier vehicle 150. As is shown in FIG. 1B, the intermodal carrier vehicle 150 includes a plurality of items 10-$n$ (e.g., consumer goods), an aerial vehicle launch and retrieval system 152, the doors 154A, 154B and an item engagement system 158. The launch and retrieval system 152 of FIG. 1B includes a conveyor having an aerial vehicle 170 thereon, and may be configured to launch the aerial vehicle 170 from the intermodal carrier vehicle 150 when the doors 154A, 154B are opened, or to retrieve one or more aerial vehicles (not shown) therein. For example, the embodiment of the launch and retrieval system 152 shown in FIG. 1B may be configured to rotate about a lateral axis to any desired degree, e.g., in order to place the conveyor at an incline or a decline angle, as well as about a vertical axis, e.g., to place the conveyor at a predetermined orientation, for loading items onto the aerial vehicle 170 and/or for launching the aerial vehicle 170 therefrom. The item engagement system 158 comprises one or more components (e.g., robotic arms or other like elements) for engaging items or materials, such as one or more of the items 10-$n$, and loading such items or materials onto the aerial vehicle 170.

Figure 1C:
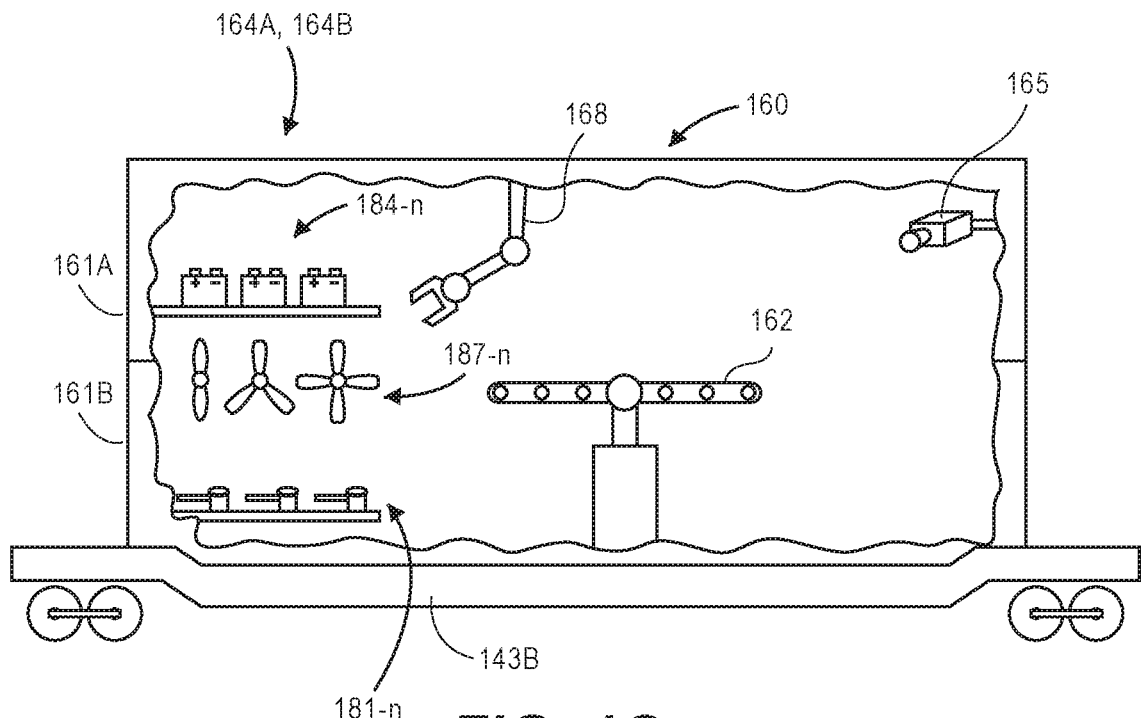

FIG. 1C is a cutaway view of the intermodal maintenance vehicle 160, which features a construction similar to that of the intermodal carrier vehicle 150. As is shown in FIG. 1C, the intermodal maintenance vehicle 160 includes a plurality of spare parts 181-$n$, 184-$n$, 187-$n$, including motors (or other propulsion modules), batteries (or other power sources), and propellers of various sizes, shapes or other characteristics. The intermodal maintenance vehicle 160 further includes a launch and retrieval system 162 that may operate in a manner that is similar to that of the launch and retrieval system 152 discussed above with regard to FIG. 1B, and a pair of doors 164A, 164B that may operate in a manner that is similar to that of the doors 154A, 154B discussed above with regard to FIG. 1B. The intermodal maintenance vehicle 160 also includes an item engagement system 168 that comprises one or more components (e.g., robotic arms or other like elements) for engaging one or more of the spare parts 181-$n$, 184-$n$, 187-$n$, such as one or more of the motors, batteries and/or propellers, and installing such spare parts 181-$n$, 184-$n$, 187-$n$ as replacements onto one or more aerial vehicles within the intermodal maintenance vehicle 160 (not shown).

Figure 1D:
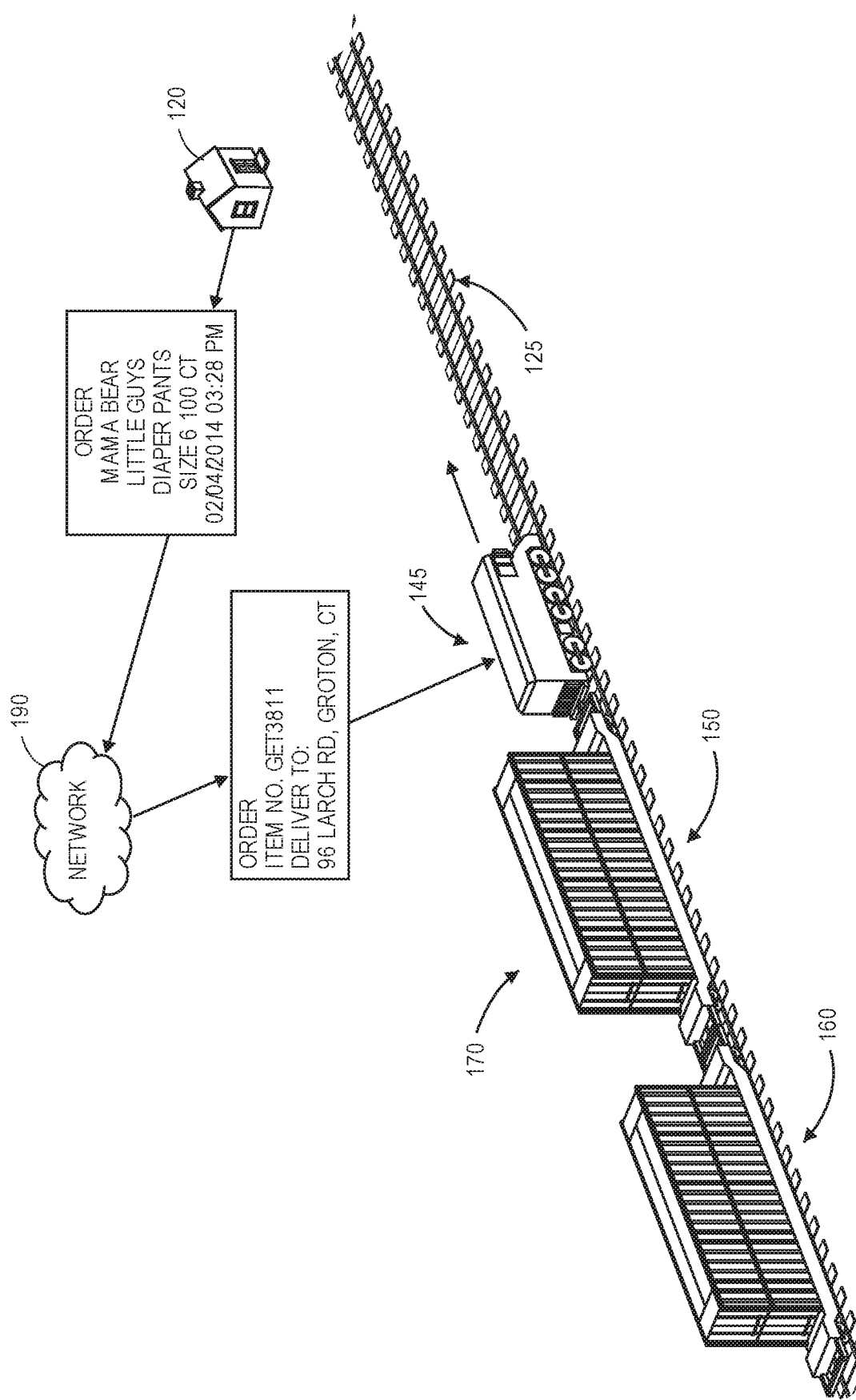

As is shown in FIG. 1D, the mobile intermodal delivery system 140 may be configured to receive orders for deliveries of one or more of the items 10-$n$ within the intermodal carrier vehicle 150, as the mobile intermodal delivery system 140 travels along the rails 125 in a predetermined direction and at a selected speed, within the aerial vehicle 170 within the intermodal carrier vehicle 150, and to provide instructions to one or more of the components therein for causing such items to be delivered by the intermodal carrier vehicle 150. For example, as is shown in FIG. 1D, a customer 120 may place an order for a specific item (viz., a box of diapers) with an online marketplace or other electronic system over a network 190, and the order may be assigned to the mobile intermodal delivery system 140 for fulfillment by one or more instructions received over the network 190.

Figure 1E:
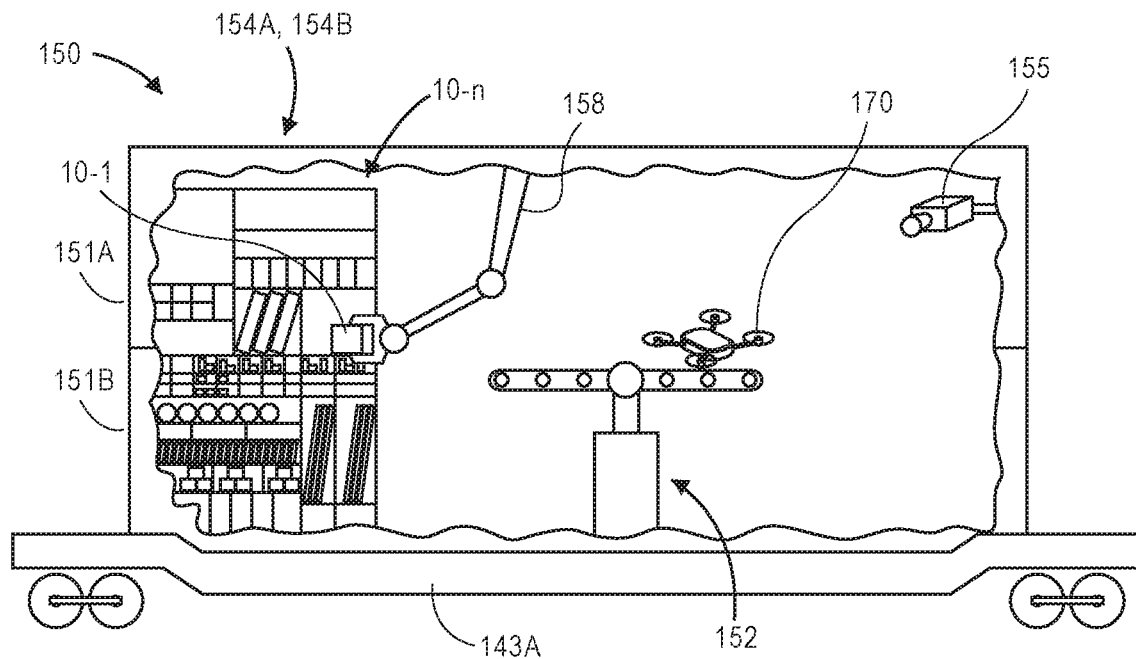
Figure 1F:
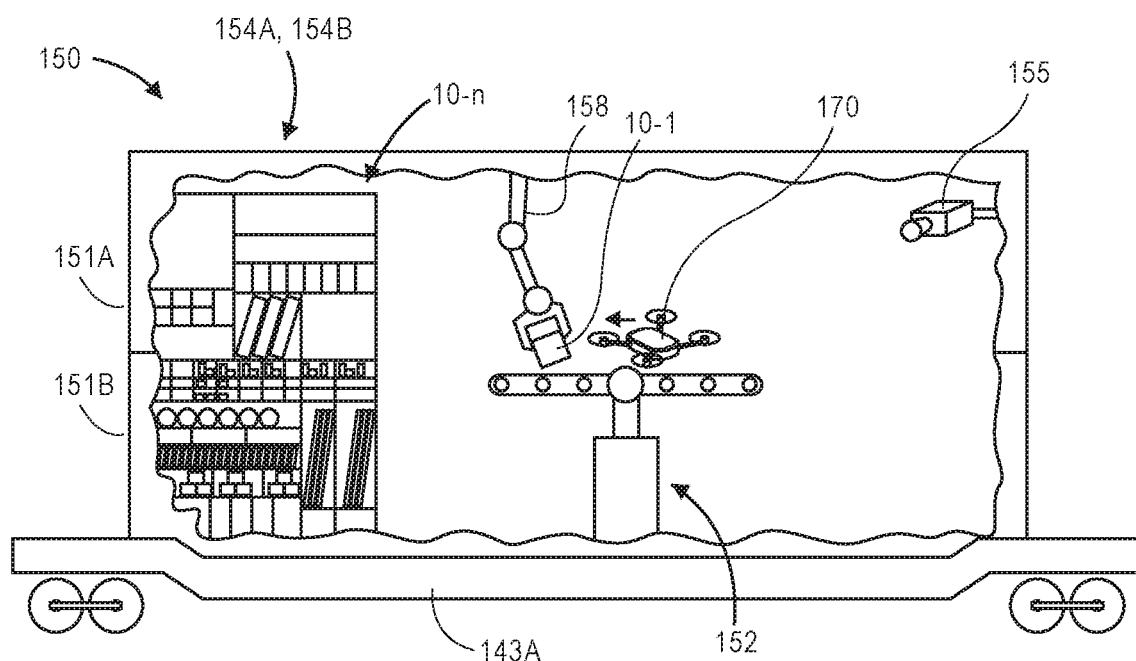

After an order for an item has been received and assigned to the intermodal delivery system 140 for fulfillment, the ordered item may be loaded into the aerial vehicle 170 within the intermodal carrier vehicle 150. As is shown in FIG. 1E and FIG. 1F, the item engagement system 158 may retrieve the item 10-1 from storage within the intermodal carrier vehicle 150, e.g., by automatically determining a position of the item 10-1 among the items 10-$n$ and gripping the item 10-1, e.g., by one or more end effectors or mechanical grips. The item 10-1 may then be transported to a point where the item 10-1 may be loaded onto the aerial vehicle 170, which may itself be transported to the point by the launch and retrieval system 152.

Figure 1G:
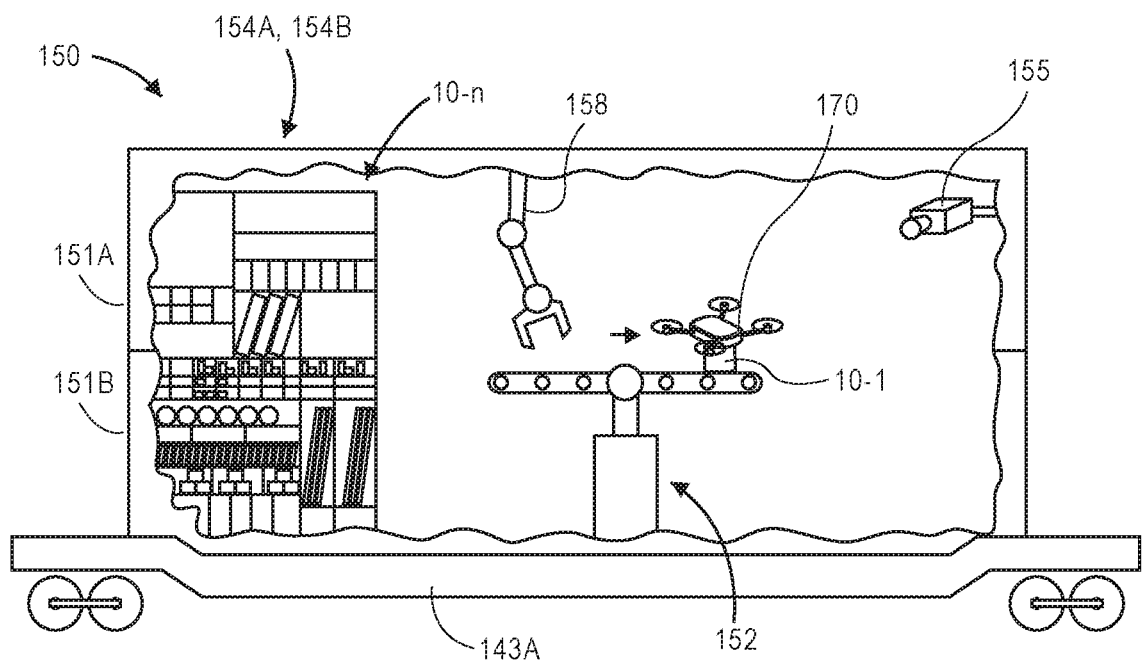
Figure 1H:
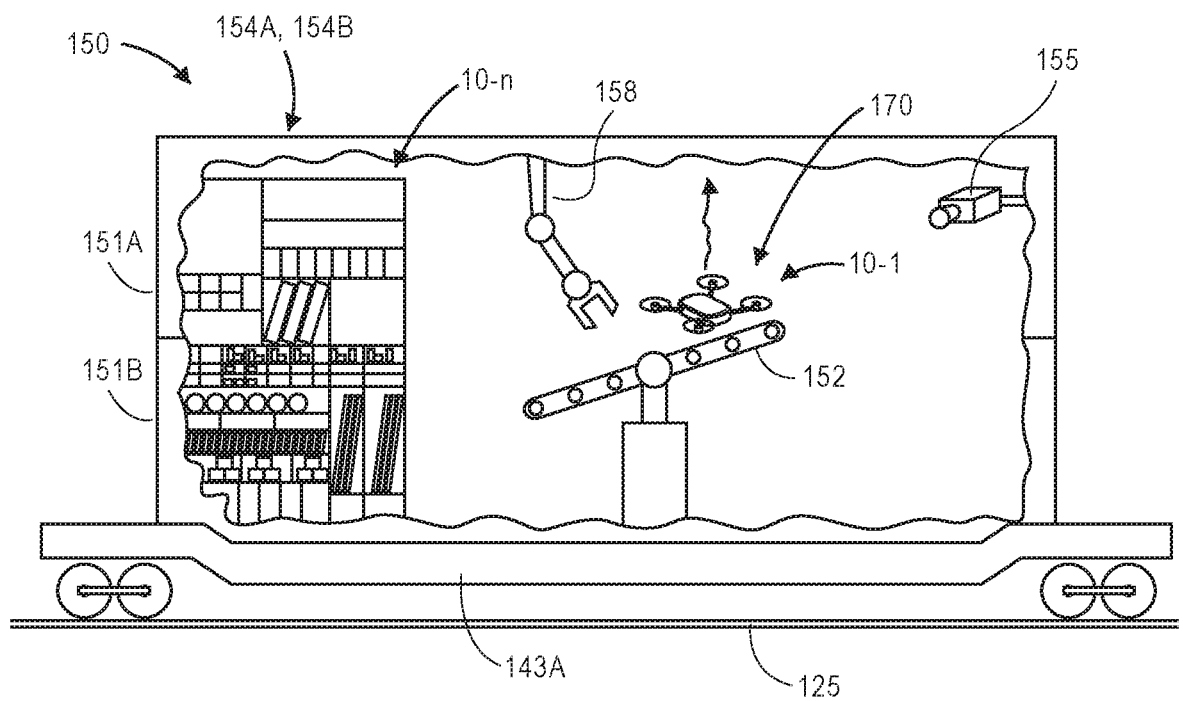

Subsequently, as is shown in FIG. 1G, after the item engagement system 158 has loaded the item 10-1 onto the aerial vehicle 170, the launch and retrieval system 152 may place the aerial vehicle 170 in an appropriate position for launch. Alternatively, one or more preferred launching conditions may be established within the intermodal carrier vehicle 150, such as by establishing a desired air velocity, a desired air pressure and/or a desired air temperature within the intermodal carrier vehicle 150. As is shown in FIG. 1H, the launch and retrieval system 152 may be aligned in a desired orientation for launching the aerial vehicle 170 therefrom. As is shown in FIG. 1I, after the top doors 154A, 154B have opened, the aerial vehicle 170 may be launched from the launch and retrieval system 152 at a departure point $P_1$. The aerial vehicle 170 may be launched under its own power or, alternatively, under power provided by the launch and retrieval system 152, or by a combination of the aerial vehicle 170 and the launch and retrieval system 152.

Figure 1J:
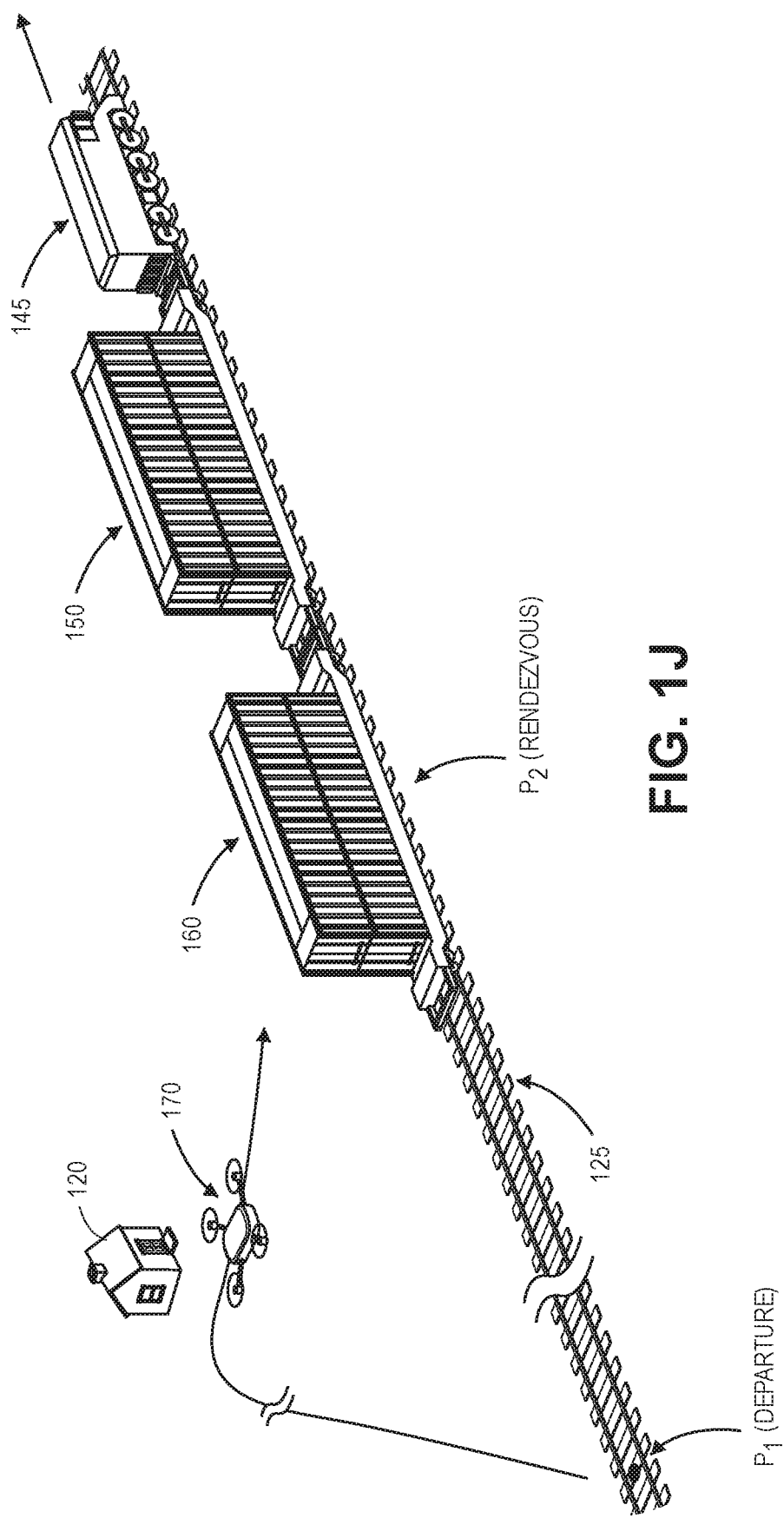

Upon clearing the intermodal carrier vehicle 150, the aerial vehicle 170 may then travel on a desired course and speed to reach a location designated by the customer 120 and to deposit the item 10-1 there. As is shown in FIG. 1J, the aerial vehicle 170 may travel on a course from the departure point $P_1$ on the rails 125 to the location of the customer 120, and deposit the item 10-1 there before meeting the mobile intermodal delivery system 140 at a rendezvous point $P_2$ on the rails 125 at a later time. The departure point $P_1$ and the rendezvous point $P_2$ may be selected based on the location of the customer 120, as well as any operational or logistical factors, considerations or constraints (e.g., prevailing weather conditions, available power levels aboard the mobile intermodal delivery system 140 or the aerial vehicle 170, as well as a required delivery date or time for the item 10-1, or for one or more of the items 10-*n* that may have been ordered by other customers, or other traffic on the rails 125). Additionally, the speed of the mobile intermodal delivery system 140 prior to, while, or after launching the aerial vehicle 170 may also be selected based on the positions of the departure point $P_1$ and the rendezvous point $P_2$, or on any other operational or logistical factors, considerations or constraints.

Figure 1K:
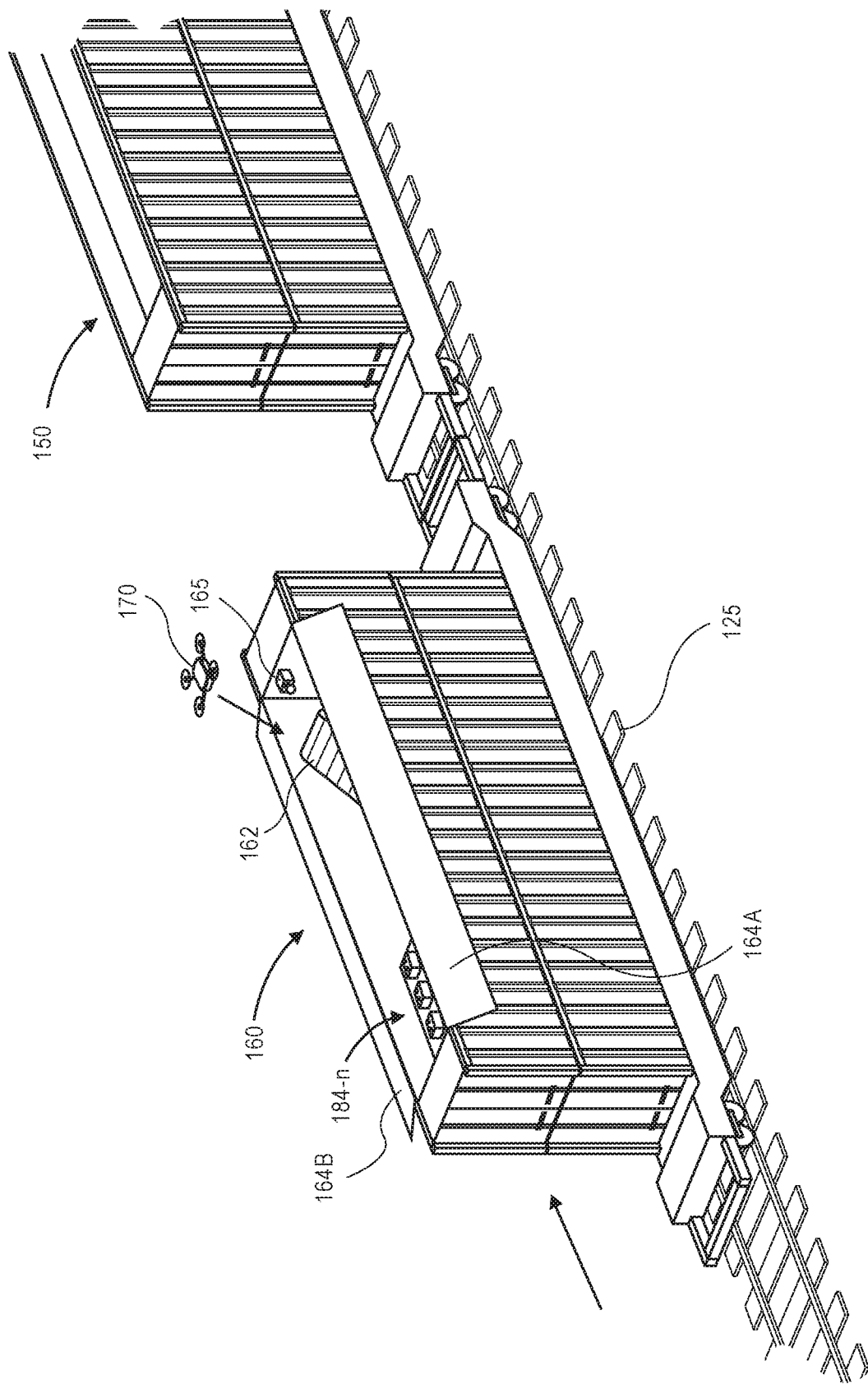

After the item 10-1 has been delivered to the customer 120, and after the aerial vehicle 170 has met the mobile intermodal delivery system 140 at the rendezvous point $P_2$, the aerial vehicle 170 may be retrieved by the intermodal carrier vehicle 150 or, as is shown in FIG. 1K, by the intermodal maintenance vehicle 160. For example, if the aerial vehicle 170 requires replacement of one or more motors, propellers and/or batteries, or any other maintenance, repairs or servicing operations, the doors 164A, 164B of the aerial vehicle 170 may be opened as the mobile intermodal delivery system 140 travels along the tracks, and the aerial vehicle 170 may land within the intermodal maintenance vehicle 160.

Figure 1L:
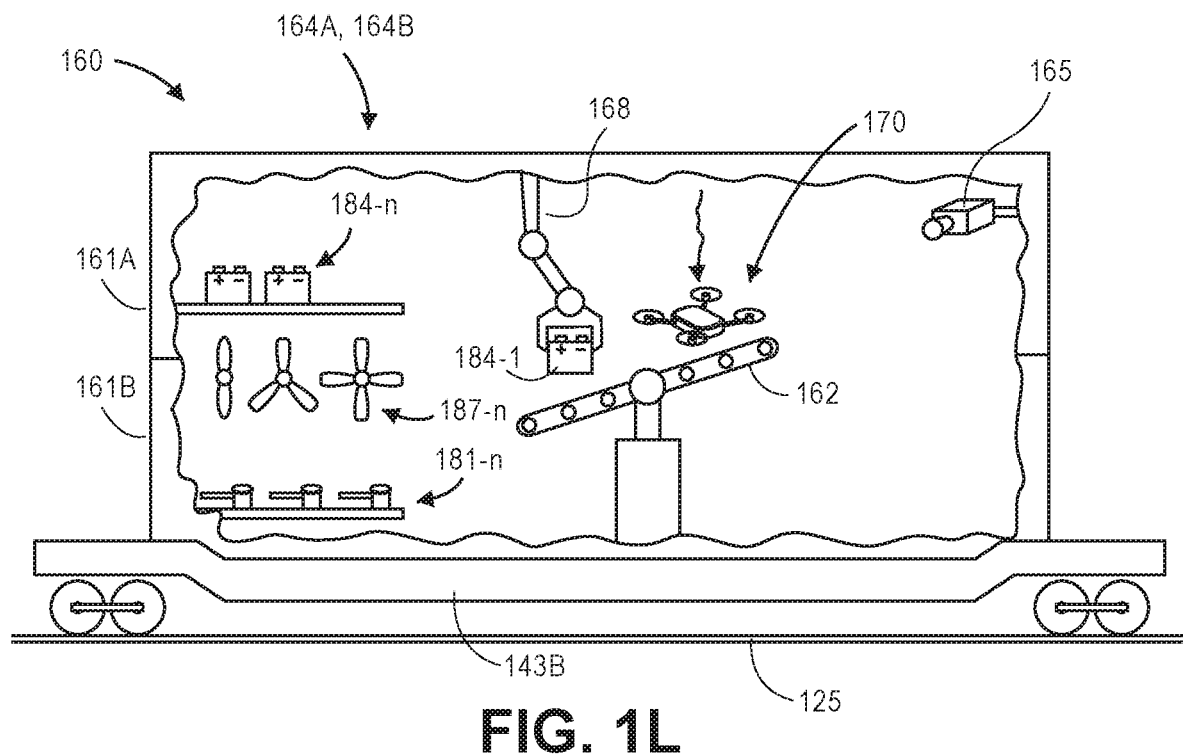

As is shown in FIG. 1L, with the aerial vehicle 170 within the intermodal maintenance vehicle 160, one of the batteries 184-*n* may be installed into the aerial vehicle 170 as a replacement. For example, the item engagement system 168 may automatically determine a position of a battery 184-1 having an appropriate voltage level, power rating or other like attribute for use in the aerial vehicle 170, and transporting the battery 184-1 to a point where the battery 184-1 may be installed in the aerial vehicle 170. After the battery 184-1 has been installed, and any testing or verifications have been performed, the aerial vehicle 170 may then remain within the intermodal maintenance vehicle 160 until the mobile intermodal delivery system 140 reaches its destination, or may depart from the intermodal maintenance vehicle 160, e.g., via the launch and retrieval system 162, and travel to one or more other locations, or to the intermodal carrier vehicle 150. For example, one or more of the remaining items 10-*n* may be loaded onto the aerial vehicle 170 and delivered thereby to another customer (not shown).

Accordingly, the systems and methods of the present disclosure are directed to mobile intermodal delivery systems that may transport aerial vehicles, and items to be delivered by such vehicles, along one or more modes of transit. Such modes may include, but are not limited to, rail-based systems (e.g., railways) as well as sea-based systems (shipping routes or channels) or other ground-based systems (e.g., interstate highways or other suitable roadways). The mobile intermodal delivery systems may be formed from intermodal containers (e.g., a standardized structure originally intended for shipping or holding items), or from similarly sized structures and materials. In this regard, a mobile intermodal delivery system of the present disclosure may effectively act as a mobile fulfillment center that utilizes one or more aerial vehicles for fulfilling orders for items, or a mobile repair facility for conducting repairs on aerial vehicles, while remaining in location within one or more selected regions.

Additionally, one or more of the mobile intermodal delivery systems disclosed herein may include intermodal carrier vehicles, such as the intermodal carrier vehicle 150 of FIGS. 1A through 1L, that may be loaded with inventory items and one or more aerial vehicles, as well as automated systems or components for loading items onto or unloading items from such aerial vehicles, e.g., loading and/or engagement systems carried thereon. The intermodal carrier vehicles may be placed in motion via one or more modes or transportation networks. Such intermodal carrier vehicles may be configured to automatically launch and retrieve aerial vehicles therefrom, and automatically load items onto (or unloading items from) such aerial vehicles, by way of one or more loading and/or engagement systems carried thereon.

Likewise, one or more of the mobile intermodal delivery systems disclosed herein may include intermodal maintenance vehicles, such as the intermodal maintenance vehicle 160 of FIGS. 1A through 1L, which may be loaded with replacement parts or other supplies or resources required in order to maintain an aerial vehicle in an operable and/or optimal condition, as well as automated systems or components for installing such parts, supplies or resources onto an aerial vehicle. The intermodal maintenance vehicles may be placed in motion via one or more modes or transportation networks. Such intermodal maintenance vehicles may be configured to automatically launch and retrieve aerial vehicles therefrom, and automatically load items onto (or unloading items from) such aerial vehicles, by way of one or more loading and/or engagement systems carried thereon.

Although the intermodal carrier vehicle 150 and the intermodal maintenance vehicle 160 of FIGS. 1A through 1L are shown as including well cars 143A, 143B that are coupled to the powered vehicle 145, those of ordinary skill in the pertinent arts will recognize that intermodal carrier vehicles and/or intermodal maintenance vehicles, such as the intermodal carrier vehicle 150 and/or the intermodal maintenance vehicle 160, may be coupled to any type or form of powered vehicle, e.g., a container ship and/or a tractor-trailer, and operated in a similar manner on waterways or roads. Moreover, one or more of the intermodal carrier vehicles and/or intermodal maintenance vehicles, such as the intermodal carrier vehicle 150 and/or the intermodal maintenance vehicle 160, may be utilized in multiple transit modes. For example, referring again to FIG. 1A, the intermodal carrier vehicle 150 may be transported to a seaport, lifted from the well car 143A, and loaded onto a container ship for transit on one or more bodies of water. Alternatively, the intermodal carrier vehicle 150 may be transported to a rail station, lifted from the well car 143A, and loaded onto a trailer, and hitched to a road tractor for further road-based transit.

Additionally, some embodiments of the mobile intermodal delivery systems disclosed herein may include both an intermodal carrier vehicle and an intermodal maintenance vehicle, such as the mobile intermodal delivery system 140 of FIGS. 1A through 1L. Some other embodiments of the mobile intermodal delivery systems disclosed herein may include an intermodal carrier vehicle, or an intermodal maintenance vehicle, but not both an intermodal carrier vehicle and an intermodal maintenance vehicle. Still other embodiments of the mobile intermodal delivery systems disclosed herein may include two or more intermodal carrier vehicles, such as two or more of the intermodal carrier vehicles 150 of FIGS. 1A through 1L, and/or two or more intermodal maintenance vehicles, such as two or more of the intermodal maintenance vehicles 160 of FIGS. 1A through 1L. Additionally, a mobile intermodal delivery system may include any number of powered vehicles for placing one or more intermodal carrier vehicles and/or intermodal maintenance vehicles in motion, e.g., two or more locomotives, containers ships and/or road tractors. Moreover, a mobile intermodal delivery vehicle system may include a single combined vehicle that includes carrier and maintenance systems, and is configured to perform the functions of both an intermodal carrier vehicle and an intermodal maintenance vehicle, or two or more of such combined vehicles.

In accordance with some embodiments of the present disclosure, inventory items may be loaded onto mobile intermodal delivery systems (e.g., onto one or more intermodal carrier vehicles) along with one or more aerial vehicles and placed in motion along a route associated with a transit mode (e.g., along a set of rails, along a shipping channel or along an interstate highway or other roadway) in a direction associated with anticipated demand for one or more of the inventory items, even before any orders for any of the inventory items has been received. For example, in advance of a release of a new book, a new video game or a new mobile device, an intermodal carrier vehicle of the present disclosure may be loaded with a plurality of the books, the video games or the mobile devices along with one or more aerial vehicles and placed in motion along an axis or in a direction associated with the anticipated demand. In particular, if the inventory items have appeal in a particular geographic region, or if certain geographic regions have been observed to favor or prefer items that are similar to the inventory items in the past, a mobile intermodal delivery system may depart a fulfillment center with an intermodal carrier vehicle loaded with a plurality of such items and one or more aerial vehicles, and may travel toward such geographic regions. When orders for one or more of the inventory items are received, such orders may be assigned to the intermodal carrier vehicle, which may then load one or more of the inventory items onto an aerial vehicle and launch the aerial vehicle in directions of destinations for one or more of the ordered items. After the ordered items have been delivered, the aerial vehicle may return to the intermodal carrier vehicle in order to be reloaded and rerouted to another destination, or to an intermodal maintenance vehicle for maintenance, repairs or service. Therefore, the intermodal carrier vehicles of the present disclosure may be used to forward-deploy inventory items from fulfillment centers or other sources of such items to regions where demand for such items may be reasonably anticipated, in order to shorten both the time and the distance required in order to deliver such items to customers who placed orders for them, or destinations specified by such customers.

Today's transportation networks feature a variety of multimodal transportation systems, including various land, sea and air transit systems, many of which were implemented in phases over time. For example, in the first half of the nineteenth century, several thousand miles of canals such as the Erie Canal, which connected New York City and the Atlantic Ocean to Chicago and the Midwest by way of the Hudson River and the Great Lakes, were dug between various bodies of water, thereby expanding the capacity of water-based vessels to deliver goods and services to more inland destinations and between seaports. The second half of the nineteenth century was dominated by the growth of railroads and rail travel, as rail lines carrying locomotives and rail cars snaked across the continent in the wake of the Industrial Revolution, highlighted by the hammering of the Golden Spike at Promontory, Utah, which completed the first transcontinental rail link between the east and west coasts of the United States.

In the twentieth century, Henry Ford's assembly lines began operating in 1913, thereby enabling the low-cost, mass production of cars and trucks for personal use. Automobiles continued to grow in popularity and efficiency with the advent of the Eisenhower Interstate Highway System in 1956, which permitted Americans to independently traverse the nation at elevated speeds on wide, structurally sound roadways and bridges. Finally, with the development of wide-body airliners such as the Boeing 747 in 1969, and the deregulation of airlines in the United States beginning in 1976, the delivery of passengers and cargo by air became increasingly efficient and cost-effective in the latter half of the twentieth century.

Intermodal containers (sometimes called intermodal freight containers, dry vans, box containers, International Standards Organization containers, or "ISO containers") are some of the most common vessels for transporting goods across the nation's transportation networks today. Intermodal containers may be easily transferred between rail-based, marine or roadway transportation systems, and may be fixed in place on a transport vehicle (e.g., a well car configured for travel on rails, a container ship, or a trailer). In some applications, intermodal containers may be stacked while in transit or in storage. By some estimates, more than twenty million intermodal containers are in use today.

One advantage of the use of intermodal containers is the relative ease with which such containers may be transferred between transit modes or carriers (e.g., rail-based, marine or roadway transportation systems). For this reason, intermodal containers typically have standard dimensions including widths of approximately eight to eight-and-one-half feet (8 to 8.5 ft) and lengths of twenty, forty, forty-five, forty-eight or fifty-three feet (20, 40, 45, 48 or 53 feet) and heights of approximately eight to ten feet (8 to 10 ft), typically eight-and-one-half or nine-and-one-half feet (8.5 or 9.5 ft). The carrying capacity of an intermodal carrier is often measured in a nominal term known as Twenty-foot Equivalent Units, or "TEU," which refer to a number of eight foot by eight foot by twenty foot (8 ft×8 ft×20 ft) volumes that may be accommodated within a given intermodal carrier. Intermodal containers are frequently constructed from steel and include steel frames and/or castings that are sufficiently durable and strong enough to accommodate cargo within while still withstanding impacts due to stacking, shocks or other contact during normal operation, and to protect the cargo therein against the elements. Because intermodal containers are constructed with durability and strength in mind, intermodal carriers have recently been repurposed into secondary uses, including for use as temporary or permanent buildings, shelters, offices or the like.

As is discussed above, and in greater detail below, the systems and methods of the present disclosure are directed to mobile intermodal delivery systems having powered vehicles along with one or more intermodal carrier vehicles and/or one or more intermodal maintenance vehicles. The powered vehicles may include locomotives coupled to one or more well cars or like vehicles that are configured to travel on one or more rails of any head sizes or shapes. Where a set of rails includes two or more of such rails, the rails may be separated by any gauge distance. Additionally, the locomotives may include one or more diesel engines, electric engines, or engines or motors that are powered by any other source of energy (e.g., gasoline, fuel cells, nuclear reactors, solar power). The well cars or like vehicles may include one or more structures, beams, trusses or other wheeled systems for accommodating intermodal containers or vehicles in accordance with the present disclosure thereon. The mobile intermodal delivery systems may include intermodal containers and/or intermodal vehicles for transporting items, launching and retrieving aerial vehicles, loading items onto or unloading items from aerial vehicles, or conducting maintenance, repairs or servicing operations on such aerial vehicles.

In some embodiments, a mobile intermodal delivery system may be used to forward-deploy inventory items, along with one or more aerial vehicles, to areas where demand for such inventory items may be reasonably anticipated, thereby enabling orders for such items to be fulfilled using such aerial vehicles from shorter distances and in shorter times than if the orders were received and assigned to fulfillment centers, warehouses or other fixed locations. Similarly, a mobile intermodal delivery system may also be routed to areas having large numbers of items that are intended to be retrieved therefrom, and such items may be retrieved using one or more aerial vehicles. In this regard, the mobile intermodal delivery systems of the present disclosure may be used to pick up items from one or more manufacturers, merchants, sellers and/or vendors or other sources for subsequent resale, or to retrieve unwanted items from customers, as well as to perform any number of other functions unrelated to electronic commerce, including but not limited to the retrieval of garbage and/or recyclable waste.

The intermodal containers of the present disclosure may have any size, shape and/or dimension that may be utilized and/or supported by powered vehicles and/or associated carriers (e.g., locomotives and/or well cars, container ships, tractors and/or trailers or the like), as well as any associated structures or systems (e.g., cranes, elevators, conveyors at fulfillment centers or other sources, or canals, channels, roadways, tunnels, bridges or other transportation infrastructure) that may be required in order to accommodate their travel or use.

Areas where demand for items, or supplies of items, are anticipated may be identified on any basis. In some embodiments, such areas may be identified by resort to information or data regarding prior purchases of items by residents living in the respective areas, or prior deliveries of items to residents of the respective areas, which may indicate that such items, or substitutes for or complements to such items, are in demand in such areas. Likewise, such areas may also be identified based on their similarities to other areas, and the demand for items or supplies of items that were previously observed in such other areas. For example, when a particular area is experiencing a lengthy spell of good weather, a national championship by a local sports team, a natural disaster, or other unique event, demand for items within the area may be identified based on demand for items observed in other areas that recently experienced lengthy spells of good weather, national championships, natural disasters, or other such unique events. Furthermore, the areas of the anticipated demand and/or supplies may be identified by determining information or data regarding demographics of residents in such areas, and identifying items that are in demand to members of such demographics, including not only members of such demographics who are residents of such areas but also other areas. Any means, methods or techniques for determining a level of demand or a level of supply for a given item, on a local or regional basis, may be utilized in accordance with embodiments of the present disclosure.

The mobile intermodal delivery systems of the present disclosure may be used to distribute items on a local basis in any manner. For example, items may be loaded into and secured within intermodal carriers on a homogenous basis, e.g., where an intermodal carrier includes a common type of item, and no others. Alternatively, items may be loaded into and secured within intermodal carriers on a heterogeneous basis, e.g., where an intermodal carrier includes a variety of types of items. Items may also be loaded into and secured within mobile intermodal delivery systems in storage compartments that are specifically tailored for such items, e.g., refrigerated or heated storage compartments within intermodal carriers for maintaining cold or hot items therein, as well as storage compartments that are generally provided for multiple types of items. Alternatively, an intermodal carrier may include any number of compartments that are configured to maintain items therein at any desired temperature (e.g., hot or cold).

Moreover, once items and aerial vehicles have been loaded into and secured within one or more intermodal carriers, the intermodal carriers may be delivered to selected regions by one or more powered vehicles based on the demand for the items maintained therein on any basis. For example, in some embodiments, intermodal carriers may be configured to travel from a fulfillment center or one or more locations on trains, on container ships or on road vehicles, with such locations being selected based on known, observed or predicted demand for such items. In some other embodiments, intermodal carriers may be delivered singly or in bulk to such regions by one or more powered vehicles, which may be manned or unmanned. For example, intermodal carriers that are loaded with items and aerial vehicles may be delivered to regions where such items are known, observed or predicted to be in demand in or by one or more powered vehicles that may be configured to travel in the air, or on land or sea, or within the physical universe beyond the Earth's atmosphere (e.g., outer space), such as cars, trucks, trailers, freight cars, container ships, cargo aircraft or spacecraft, or other like vehicles. Likewise, intermodal carriers may be retrieved from such regions by one or more powered vehicles, and returned to a fulfillment center or other facility, e.g., for loading, reloading or maintenance, as desired.

Figure 2A:
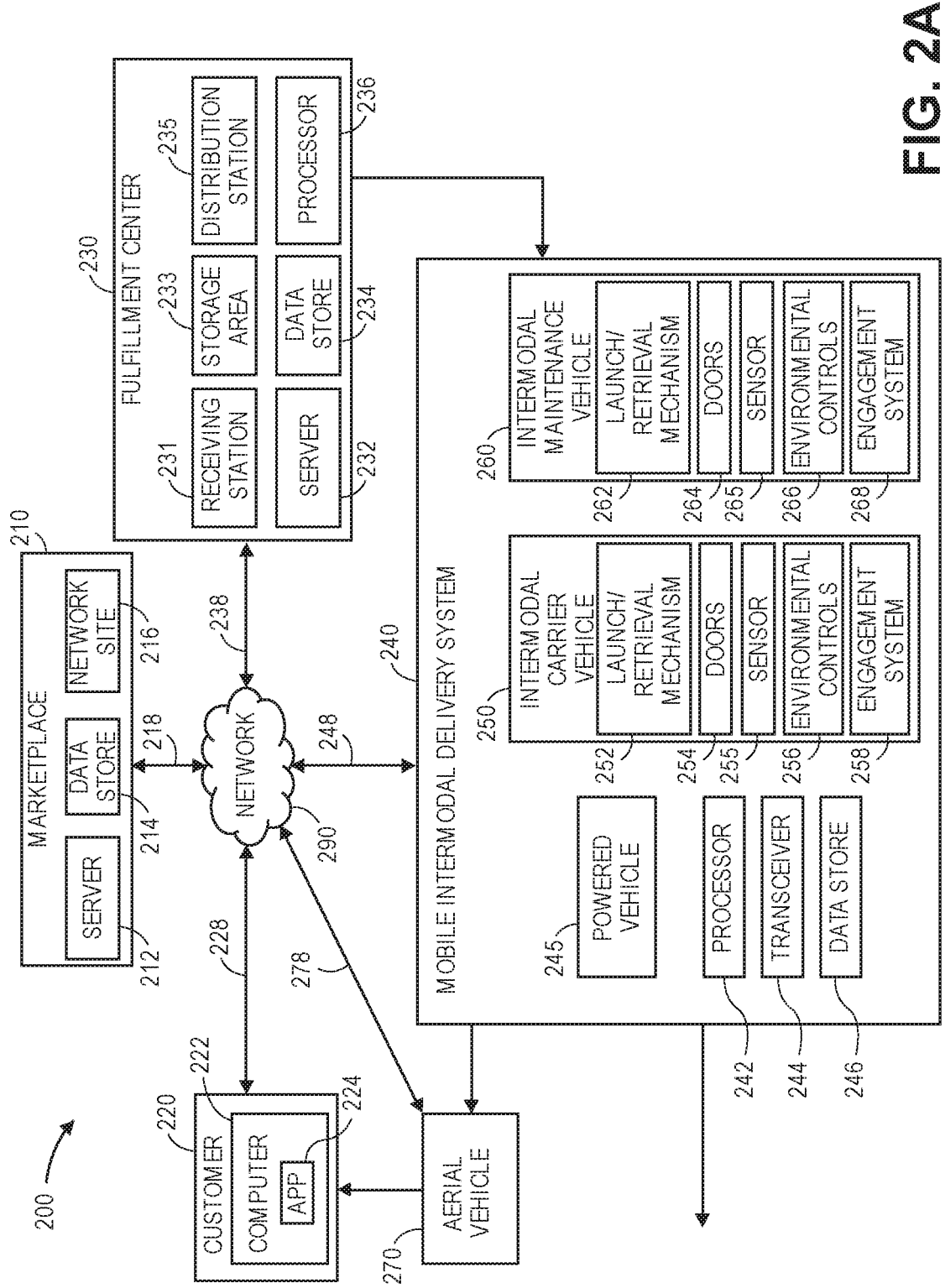
FIGS. 2A and 2B are block diagrams of components of one system including a mobile intermodal delivery system in accordance with embodiments of the present disclosure.
Figure 2B:
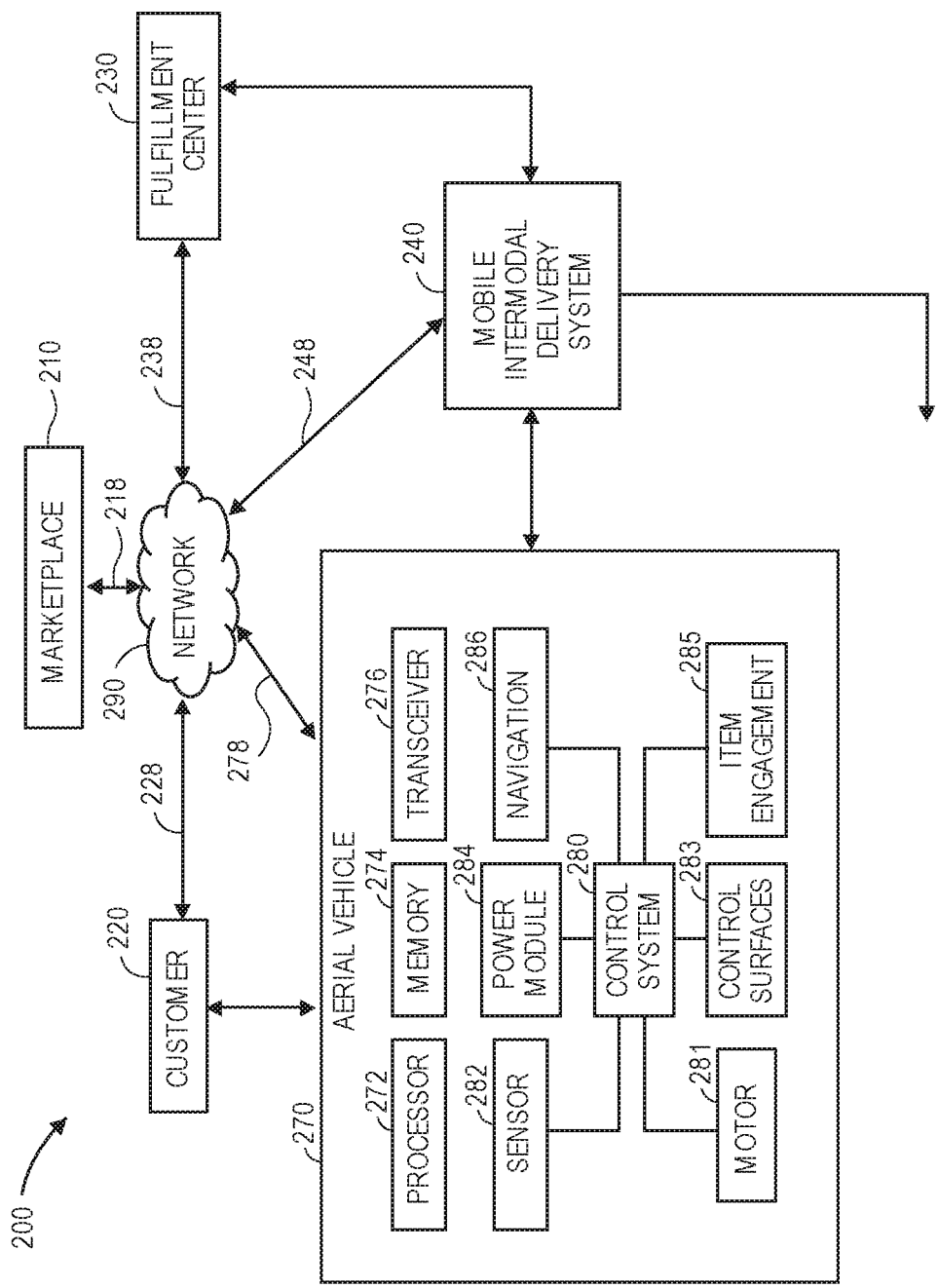

Referring to FIGS. 2A and 2B, a block diagram of components of one system 200 including a mobile intermodal delivery system 240 in accordance with embodiments of the present disclosure is shown. The system 200 includes a marketplace 210, a customer 220, a fulfillment center 230, a mobile intermodal delivery system 240 and an aerial vehicle 270 that are connected to one another across a network 290, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1L.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 290, as indicated by line 218, through the sending and receiving of digital data. Moreover, the data store 214 may include any type of information regarding items that have been made available for sale through the marketplace 210, or ordered by customers, such as the customer 220, from the marketplace 210, or any information or data regarding the delivery of such items to the customers by any means, including but not limited to the mobile intermodal delivery system 240 and/or the aerial vehicle 270. For example, the servers 212 may be configured to make one or more determinations regarding regions or areas where one or more specific items are in demand based on information or data stored in the data stores 214 or on one or more external computer devices, e.g., over the network 290.

The servers 212, or one or more other computer devices, may determine actual or predicted demand for one or more items in any number of regions or areas on any basis. Once demand in any given region or area has been determined, the demand may be compared to one or more thresholds or limits to determine whether the demand is sufficiently great, on an actual or relative basis, in order to justify distributing or forward-deploying items to the given region by one or more mobile intermodal delivery systems. For example, in some embodiments, a total-market prediction of demand may be determined by defining a market, identifying drivers of demand in each of the markets, predicting how such drivers may be anticipated to change, and localizing the effects of such changes to a given region or location. In some other embodiments, a prediction of local demand in a region or location may be determined based on prior sales of items in the region or location, and determining whether such sales are expected to increase, decrease or remain constant. For example, where a neighborhood includes a fixed number of homes, demand for specific items (e.g., bicycles, smartphones, outdoor grills, basketballs) may be determined based on an analysis of demographics (e.g., residents who are of varying ages, genders, ethnicities or religions), within the neighborhood, as compared to demographics in the neighborhood in previous years, or demographics in other similarly situated neighborhoods. In some embodiments, the servers 212, or the one or more other computer devices, may identify any upcoming local, regional, national or global events, and project demand for items pertaining to such events in a general manner, or in specific locations or regions. The level of specificity or granularity associated with a projection may be selected on any basis. In other embodiments, demand for items in a given region may be determined based on local laws, regulations or customs in effect within the region.

The fulfillment center 230 may be any facility that is adapted to receive, store, process and/or distribute items. As is shown in FIG. 2A, the fulfillment center 230 includes a server 232, a data store 234, and one or more computer processors 236. The fulfillment center 230 also includes stations for receiving, storing and distributing items to customers, including but not limited to a receiving station 231, a storage area 233 and a distribution station 235.

The server 232 and/or the processors 236 may operate one or more order processing and/or communication systems and/or software applications having one or more user interfaces, or communicate with one or more other computing devices or machines that may be connected to the network 290, as indicated by line 238, for transmitting or receiving information in the form of digital or analog data, or for any other purpose. For example, the server 232 and/or the processors 236 may also operate or provide access to one or more reporting systems for receiving or displaying information or data regarding orders for items received by the marketplace 210, or deliveries made by any means, e.g., the mobile intermodal delivery system 240 and/or the aerial vehicle 270, and may provide one or more interfaces for receiving interactions (e.g., text, numeric entries or selections) from one or more operators, users, workers or other persons in response to such information or data. The server 232, the data store 234 and/or the processor 236 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

For example, the server 232 and/or the processors 236 may be configured to determine an optimal path or route between two locations for the execution of a given mission or task to be executed by the mobile intermodal delivery system 240 and/or the aerial vehicle 270 on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique.

Additionally, the server 232 and/or the processors 236 may be configured to control or direct, or to recommend or suggest, collaboration between or among one or more of the mobile intermodal delivery systems 240 and/or the aerial vehicle 270 and any number of other vehicles in the performance of one or more tasks or in the execution of one or more functions. For example, the server 232 and/or the processors 236 may be configured to identify levels of inventory distributed among one or more of the mobile intermodal delivery systems 240 or aboard other vehicles or in other locations, and to identify an optimal path to be traveled by the mobile intermodal delivery systems 240 and/or one or more aerial vehicles 270 in delivering such items to a customer or other destination. Moreover, the server 232 may be configured to provide one or more aerial vehicles 270 with one or more sets of instructions for traveling from an origin to a destination, or from the destination to the origin, or for performing any task in accordance with the present disclosure.

Additionally, the server 232 and/or the processor 236 may determine which of the mobile intermodal delivery systems 240 and/or aerial vehicles 270 is appropriately equipped to deliver one or more items to a location or to retrieve one or more items therefrom on any basis, including but not limited to their respective proximity to the location and/or a departure point on one or more modes or networks or a rendezvous point on one or more such modes or networks, e.g., the points $P_1$ and $P_2$ shown in FIG. 1G, as compared to those of other mobile intermodal delivery systems 240 and/or aerial vehicles 270, or on any other relevant factor or basis. The server 232 and/or the processor 236 may select the appropriate departure points and/or rendezvous points where one or more mobile intermodal delivery systems 240 and/or aerial vehicles 270 may meet in order transfer inventory or materials therebetween, or for any other purpose. The departure points and/or the rendezvous points may be selected on any basis, including but not limited to a net cost, a net distance or a net time required for a given mobile intermodal delivery system 240 and/or a given aerial vehicle 270 to execute a given task, or on any other basis.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), as well as one or more of the mobile intermodal delivery systems 240 and/or aerial vehicles 270, and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to locations or destinations specified by customers, e.g., by way of one or more of the mobile intermodal delivery systems 240 and/or aerial vehicles 270, or any other vehicle of any type, e.g., cars, trucks, trailers, freight cars, container ships or cargo aircraft (e.g., manned aircraft or unmanned aircraft, such as drones). Such locations or destinations may include, but are not limited to, facilities having specific addresses or other geocoded identifiers (e.g., dwellings or businesses), as well as storage lockers or other temporary storage or receiving facilities. Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the server 232, the data store 234 and/or the processor 236, or with one or more other computing devices or machines, and may communicate with the receiving station 231, the storage area 233 or the distribution station 235 within the fulfillment center 230 by any known wired or wireless means, or with the marketplace 210, the customer 220 or one or more of the mobile intermodal delivery systems 240 and/or aerial vehicles 270 over the network 290, as indicated by line 238, through the sending and receiving of digital data.

Additionally, the fulfillment center 230 may include one or more systems or devices (not shown in FIG. 2A or FIG. 2B) for determining locations of one or more elements therein, such as cameras or other image recording devices. Furthermore, the fulfillment center 230 may also include one or more workers or staff members (not shown in FIG. 2A or FIG. 2B), who may handle or transport items within the fulfillment center 230. Such workers may operate one or more computing devices or machines for registering the receipt, retrieval, transportation or storage of items within the fulfillment center, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 220 may be any entity or individual that wishes to download, purchase, rent, lease, borrow or otherwise obtain items (which may include goods, products, services or information of any type or form) from the marketplace 210, e.g., for delivery by one or more of the mobile intermodal delivery systems 240 and/or aerial vehicles 270. The customer 220 may utilize one or more computing devices 222 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 224, such as a web browser or a shopping application, and may be connected to or otherwise communicate with the marketplace 210, the fulfillment center 230, or one or more of the mobile intermodal delivery systems 240 and/or aerial vehicles 270 through the network 290, as indicated by line 228, by the transmission and receipt of digital data.

The mobile intermodal delivery system 240 may be any self-powered system for transporting and/or receiving items via aerial vehicles, for performing maintenance, repairs or servicing operations on such aerial vehicles, or for forward-deploying items for delivery by such aerial vehicles in accordance with one or more embodiments of the present disclosure. As is shown in FIG. 2A, the mobile intermodal delivery system 240 includes a networked computer infrastructure, including one or more physical computer processors 242, transceivers 244 and/or data stores (e.g., data bases and/or other memory components) 246 that may connect or otherwise communicate with one or more external computer devices over the network 290, as indicated by line 248, by the transmission and/or receipt of information or data in the form of digital or analog data, or for any other purpose. For example, the mobile intermodal delivery system 240 may receive instructions or other information or data via the transceiver 244 regarding an item that is to be delivered from the intermodal carrier vehicle 250 to the customer 220 from the marketplace server 212, the customer computing device 222 and/or the fulfillment center server 232, or from any other computing device over the network 290. The transceiver 244 may be configured to enable the mobile intermodal delivery system 240 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceiver 244 may further include or be in communication with one or more input/output (or "I/O") interfaces, network interfaces and/or input/output devices, and may be configured to allow information or data to be exchanged between one or more of the components of the mobile intermodal delivery system 240 or to one or more other computer devices or systems (e.g., other aerial vehicles, not shown) via the network 290. For example, in some embodiments, the transceiver 244 may be configured to coordinate I/O traffic between the processor 242 and one or more onboard or external computer devices or components. The transceiver 244 may perform any necessary protocol, timing or other data transformations in order to convert data signals from a first format suitable for use by one component into a second format suitable for use by another component. In some embodiments, the transceiver 244 may include support for devices attached through various types of peripheral buses, e.g., variants of the Peripheral Component Interconnect (PCI) bus standard or the Universal Serial Bus (USB) standard. In some other embodiments, functions of the transceiver 244 may be split into two or more separate components, or incorporated directly into the processor 242 and/or the data stores 246.

Additionally, the mobile intermodal delivery system 240 may further include one or more powered vehicles 245 as well as one or more intermodal carrier vehicles 250 and/or one or more intermodal maintenance vehicles 260, which may be coupled directly or indirectly to the one or more powered vehicles 245. In some embodiments, the powered vehicles 245 may be any type of train and/or locomotive (e.g., light rail trains, heavy rail trains, high-speed trains, maglev trains), any type of seagoing vessel (e.g., container ships and/or cargo ships), any type of road vehicle (e.g., cars, trucks, tractors and/or trailers, or the like), as well as vehicles configured for travel via other forms or modes of transit (e.g., hyperloop systems having low-pressure or vacuum tubes and capsules transported therein) powered by any type or form of power source and/or prime mover. For example, the powered vehicle 245 may receive power by any manner and in any form, including but not limited to alternating current (AC) electric power, direct current (DC) electric power, solar power, geothermal power, wind power, nuclear power, fuel cells or any form of petroleum-based power, e.g., gasoline, diesel fuel, natural gas and/or propane.

The intermodal carrier vehicle 250 may be any vehicle or vessel configured to carry one or more items and/or aerial vehicles that may be releasably coupled to the powered vehicle 245 and/or to one or more of the intermodal maintenance vehicles 260, and configured to launch and/or retrieve aerial vehicles while in transit. As is shown in FIG. 2A, the intermodal carrier vehicle 250 includes one or more launch and retrieval mechanisms 252, one or more doors 254 or other access points, one or more sensors 255, one or more environmental controls 256 and one or more item engagement systems 258.

The launch and retrieval mechanisms 252 may include one or more elevators, pulleys, lifts, catapults or other components for raising, lowering and/or rotating the aerial vehicles 270 or for otherwise placing the aerial vehicles 270 in a desired position and/or orientation within a compartment defined by the intermodal carrier vehicle 250. Additionally, the launch and retrieval mechanisms 252 may include one or more conveyors for causing the aerial vehicles 270 to travel in one or more directions thereon, or for guiding one or more items into a payload compartment or other aspect of the aerial vehicles 270.

The doors 254 are any motorized systems that may be automatically opened and/or closed to provide or restrict access to a compartment defined by the intermodal carrier vehicle 250. The doors 254 may include any number of manual or automatic features for causing the opening or closing thereof, and may have any suitable dimensions with respect to the dimensions of the compartment. The doors 254 are preferably disposed on an upper surface (e.g., a roof and/or ceiling of the compartment) of the intermodal carrier vehicle 250 but may, in some embodiments, be disposed on front, rear, side or lower surfaces of the intermodal carrier vehicle 250. In some embodiments, the doors 254 may be rotatably connected to one or more aspects of the intermodal carrier vehicle 250 by a pair of hinges. In other embodiments, the doors 254 may take the form of one or more slidable or rollable (e.g., roll-top, roll-up or roll-back) doors having one or more shafts, bearings, adaptor rings, guide rails and/or slats for guiding the doors 254 during opening and/or closing operations. For example, in some embodiments, the intermodal carrier vehicle 250 may include a single door 254 that is configured to open in a single direction, e.g., by sliding, swinging or translating from left to right, from right to left, from forward aft or from aft forward. In other embodiments, the intermodal carrier vehicle 250 may include two or more doors 254 that may open in a split fashion, i.e., with a first door 254 sliding, swinging or translating in one direction from an intersection point and a second door 254 sliding, swinging or translating in an opposite direction from the intersection point.

The sensors 255 may include one or more position sensors (e.g., Global Positioning Satellite system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 255 may include any number of memory or storage components and processors, photosensitive surfaces, filters, chips, electrodes, clocks, boards, timers or any other relevant features (not shown) for aiding in their operation.

For example, one or more of the sensors 255 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the intermodal carrier vehicle 250, or for any other purpose. For example, a sensor 255 may be configured to capture or detect reflected light if the reflected light is within a field of view of the sensor 255, which is defined as a function of a distance between an imaging sensor and a lens within the sensor 255, viz., a focal length, as well as a location of the sensor 255 and an angular orientation of the lens. Accordingly, where an object appears within a depth of field, or a distance within the field of view where the clarity and focus is sufficiently sharp, the sensor 255 may capture light that is reflected off objects of any kind to a sufficiently high degree of resolution using one or more sensors thereof, and store information regarding the reflected light in one or more data files.

The sensors 255 may also include manual or automatic features for modifying a field of view or orientation. For example, one or more of the sensors 255 may be a digital camera configured in a fixed position, or with a fixed focal length (e.g., fixed-focus lenses) or angular orientation. Alternatively, one or more of the sensors 255 may include one or more actuated or motorized features for adjusting a position of a sensor 255, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 255, or a change in one or more of the angles defining the angular orientation of the sensor 255.

For example, one or more of the sensors 255 may be an imaging device that is hard-mounted to a support or mounting that maintains the imaging device in a fixed configuration or angle with respect to one, two or three axes. Alternatively, however, a sensor 255 may be provided with one or more motors and/or controllers for manually or automatically operating one or more of the components, or for reorienting the axis or direction of the sensor 255, i.e., by panning or tilting the sensor 255. Panning the sensor 255 may cause a rotation within a horizontal plane or about a vertical axis (e.g., a yaw), while tilting the sensor 255 may cause a rotation within a vertical plane or about a horizontal axis (e.g., a pitch). Additionally, the sensor 255 may be rolled, or rotated about its axis of rotation, and within a plane that is perpendicular to the axis of rotation and substantially parallel to a field of view of the sensor 255.

In some embodiments, imaging data (e.g., still or moving images, as well as associated audio data or metadata) captured using the sensor 255 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensors 255 may further include one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

One or more of the sensors 255 may also be an item identification sensor and may include a bar code scanner, a radiofrequency identification (or RFID) reader, or other technology that is utilized to determine an identification of an item that is being retrieved or deposited, or has been retrieved or deposited, by the aerial vehicle 270. In some embodiments, the sensor 255 may be a presence detection sensor and/or a motion sensor for detecting the presence or absence of one or more objects within the intermodal carrier vehicle 250, or movement of objects therein.

One or more of the sensors 255 may be further configured to capture, record and/or analyze information or data regarding its positions, velocities, accelerations or orientations of the intermodal carrier vehicle 250, and to analyze such data or information by one or more means, e.g., by aggregating or summing such data or information to form one or more qualitative or quantitative metrics of the movement of the sensor 255 and/or the intermodal carrier vehicle 250. For example, a net vector indicative of any and all relevant movements of the intermodal carrier vehicle 250, including but not limited to physical positions, velocities, accelerations or orientations of the intermodal carrier vehicle 250, may be derived based on information or data captured by the sensor 255. Additionally, coefficients or scalars indicative of the relative movements of the intermodal carrier vehicle 250 may also be defined based on such information or data.

The environmental controls 256 may include one or more ducts, vents, intakes or outlets that enable air flow to enter the compartment defined by the intermodal carrier vehicle 250, to travel therethrough at desired velocities and/or pressures, and/or to exit from the compartment defined by the intermodal carrier vehicle 250. For example, the environmental controls 256 may include one or more intake ducts and/or valves or other systems of any size or shape and having any dimensions, as required. Such intake ducts may be formed as one or more fairings in an external surface of the intermodal carrier vehicle 250, e.g., the same width as the intermodal carrier vehicle 250 or a larger or smaller width. Likewise, the environmental controls 256 may include one or more outlets or outlet ducts and/or valves or other systems of any size or shape and having any dimensions, as required. The environmental controls 256 may include one or more air openings or channels extending to an exterior of the intermodal carrier vehicle 250, and may include one or more sub-openings or sub-channels in parallel. Additionally, the environmental controls 256 may be aligned coaxially with the intermodal carrier vehicle 250, or parallel to an axis of the intermodal carrier vehicle 250. Alternatively, the environmental controls 256 may be aligned at another angle with respect to the intermodal carrier vehicle 250. Moreover, the environmental controls 256 may be any type of manually or automatically operable opening, e.g., a louver, a flap or any other type of valve that may be controlled (e.g., opened, closed or throttled) in order to cause or alter a flow of air passing therethrough. The environmental controls 256 may include one or more expansion sections for diffusing air, as well as one or more sets of screens, filters or traps which cause any debris or unwanted materials to fall out of the airflow and into a tank or other holding system. The environmental controls 256 may further include any number of heaters, chillers, humidifiers, dehumidifiers or any other systems for achieving a desired environmental condition (e.g., temperature, humidity) within the compartment defined by the intermodal carrier vehicle 250.

The engagement systems 258 may be any mechanical components, e.g., robotic arms, cable robots or other systems, for engaging an item within the intermodal carrier vehicle 250, for disengaging the item, or for loading the item into the aerial vehicles 270, as desired. For example, when the aerial vehicles 270 is tasked with delivering items or materials from a departure point of the mobile intermodal delivery system 240 to a destination, the engagement system 258 may be used to engage the items or materials within the compartment of the intermodal carrier vehicle 250 and to deposit the items or materials in a cargo bay or other storage compartment of the aerial vehicles 270 prior to departing. After an aerial vehicle 270 has arrived at the destination and returned to the intermodal carrier vehicle 250, the engagement system 258 may load another item into the cargo bay or other storage compartment of the aerial vehicles 270. Conversely, the engagement system 258 may also be used to retrieve items or materials from a cargo bay or storage compartment of an aerial vehicle 270, and deposit the items or materials in a desired location at of the compartment defined by the intermodal carrier vehicle 250. The engagement systems 258 may include any number of controllers, arms, end effectors, drive systems and/or sensors for identifying locations of one or more items within the intermodal carrier vehicle 250, engaging one or more of the items at such locations, delivering such items to the aerial vehicles 270 or another location within the intermodal carrier vehicle 250, and depositing or installing such items within the aerial vehicles 270 either directly or by way of one or more conveyors or other systems.

In some embodiments, the intermodal carrier vehicle 250 may be formed from one or more intermodal containers, e.g., steel structural vessels having standard sizes and/or shapes, by way of repurposing or reconstructing such intermodal containers in order to install the launch and retrieval mechanisms 252, the doors 254, the sensors 255, the environmental controls 256 and/or the item engagement systems 258 therein. The intermodal carrier vehicle 250 may also include any number of computer processors, data stores, memory components or communications equipment for controlling the operation of the launch and retrieval mechanism 252, the doors 254, the sensors 255, the environmental controls 256 and/or the engagement system 258, or for receiving instructions for the operation thereof.

The intermodal maintenance vehicle 260 may be any vehicle or vessel that may be releasably coupled to the powered vehicle 245 and/or to one or more of the intermodal carrier vehicles 250, and configured to launch and/or retrieve aerial vehicles while in transit. In particular, the intermodal maintenance vehicle 260 may receive an aerial vehicle 270 within a compartment and execute one or more maintenance, repairs or servicing operations on the aerial vehicle 270 within the compartment before launching the aerial vehicle 270 therefrom. As is shown in FIG. 2A, the intermodal maintenance vehicle 260 includes one or more launch and retrieval mechanisms 262, one or more doors 264 or other access points, one or more sensors 265, one or more environmental controls 266 and one or more item engagement systems 268. The launch and retrieval mechanisms 262, the doors 264, the sensors 265 and/or the environmental controls 266 may operate in the manner described above with regard to the launch and retrieval mechanisms 252, the doors 254, the sensors 255 and/or the environmental controls 256 of the intermodal carrier vehicle 250, or in a similar manner, and may include any of the attributes or features of the launch and retrieval mechanisms 252, the doors 254, the sensors 255 and/or the environmental controls 256 described above.

Additionally, the engagement system 268 may be any mechanical components, e.g., robotic arms, cable robots or other automated systems for performing one or more maintenance, repairs or servicing evolutions on an aerial vehicle 270 within the intermodal maintenance vehicle 260, as desired. For example, when an aerial vehicle 270 has a broken propeller, a faulted motor, a battery with a low charge level, or any other issue or discrepancy, or otherwise requires any other maintenance, repairs or servicing evolutions (e.g., inspections or evaluations), the aerial vehicle 270 may be received within the compartment defined by the intermodal maintenance vehicle 260, e.g., by the launch and retrieval mechanism 262, and a replacement propeller, a replacement motor or a replacement battery may be installed therein. Alternatively, any type or form of inspections or evaluations may be performed on an aerial vehicle 270 within the intermodal maintenance vehicle 260. Like the engagement systems 258, the engagement systems 268 may include any number of controllers, arms, end effectors, drive systems and/or sensors for identifying locations of one or more items within the intermodal maintenance vehicle 260, engaging one or more of the items at such locations, delivering such items to the aerial vehicle 270 or another location within the intermodal maintenance vehicle 260, and depositing or installing such items within the aerial vehicle 270 either directly or by way of one or more conveyors or other systems.

In some embodiments, the intermodal maintenance vehicle 260 may, like the intermodal carrier vehicle 250, be formed from one or more intermodal containers, e.g., steel structural vessels having standard sizes and/or shapes, by way of repurposing or reconstructing such intermodal containers in order to install the launch and retrieval mechanisms 262, the doors 264, the environmental controls 266 and/or the item engagement systems 258 therein. The intermodal carrier vehicle 260 may also include any number of computer processors, data stores, memory components or communications equipment for controlling the operation of the launch and retrieval mechanism 262, the doors 264, the environmental controls 266 and/or the engagement system 268, or for receiving instructions for the operation thereof.

As is shown in FIG. 2B, the aerial vehicle 270 includes a processor 272, a memory 274 and a transceiver 276, as well as a control system 280, one or more propulsion motors 281, one or more control surfaces 283, one or more item engagement systems 285, one or more sensors 282, one or more power modules 284, and one or more navigation modules 286.

The processor 272 may be configured to perform any type or form of computing function, including but not limited to the execution of one or more machine learning algorithms or techniques. For example, the processor 272 may control any aspects of the operation of the aerial vehicle 270 and the one or more computer-based components thereon, including but not limited to the propulsion motors 281, the control surfaces 283, the item engagement systems 285, the sensors 282, the power modules 284 and/or the navigation modules 286.

The processor 272 may be a uniprocessor system including one processor, or a multiprocessor system including several processors (e.g., two, four, eight, or another suitable number), and may be capable of executing instructions. For example, in some embodiments, the processor 272 may be a general-purpose or embedded processor implementing any of a number of instruction set architectures (ISAs), such as the x86, PowerPC, SPARC, or MIPS ISAs, or any other suitable ISA. Where the processor 272 is a multiprocessor system, each of the processors within the multiprocessor system may operate the same ISA, or different ISAs.

The aerial vehicle 270 further includes one or more memory or storage components 274 (such as databases or data stores) for storing any type of information or data, e.g., instructions for operating the aerial vehicle 270, or information or data captured during operations of the aerial vehicle 270. Additionally, the memory 274 may be configured to store executable instructions, flight paths, flight control parameters and/or other data items accessible by or to the processor 272. The memory 274 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 276, e.g., by transmission media or signals, such as electrical, electromagnetic, or digital signals, which may be conveyed via a communication medium such as a wired and/or a wireless link.

The transceiver 276 may be configured to enable the aerial vehicle 270 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 276 may further include or be in communication with one or more input/output (or "I/O") interfaces, network interfaces and/or input/output devices, and may be configured to allow information or data to be exchanged between one or more of the components of the aerial vehicle 270, or to one or more other computer devices or systems (e.g., other aerial vehicles, not shown) via the network 290. For example, in some embodiments, the transceiver 276 may be configured to coordinate I/O traffic between the processor 272 and one or more onboard or external computer devices or components. The transceiver 276 may perform any necessary protocol, timing or other data transformations in order to convert data signals from a first format suitable for use by one component into a second format suitable for use by another component. In some embodiments, the transceiver 276 may include support for devices attached through various types of peripheral buses, e.g., variants of the Peripheral Component Interconnect (PCI) bus standard or the Universal Serial Bus (USB) standard. In some other embodiments, functions of the transceiver 276 may be split into two or more separate components, or incorporated directly into the processor 272.

In some embodiments, the transceiver 276 may transmit and/or receive signals according to the Bluetooth® Low Energy, e.g., within a frequency spectrum of approximately 2.4000 to 2.4835 gigahertz (GHz), and in two-megahertz (2 MHz) channels, or according to the Ultra Wideband standard, e.g., within a frequency spectrum of approximately 3.1 to 10.6 gigahertz (GHz), with bandwidths of at least five hundred megahertz (500 MHz), or at least twenty percent of a center frequency. The transceiver 276 may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 276 may be of any kind or type, and may be sent over the network 290, e.g., as is indicated by line 278, or directly to one or more of the computing device 222 of the customer 220, to the processor 242 of the powered vehicle 245, the intermodal carrier vehicle 250 and/or the intermodal maintenance vehicle 260, or to other aerial vehicles (not shown).

The control system 280 may include one or more software applications or hardware components configured for controlling or monitoring operations of one or more components such as the propulsion motors 281, the control surfaces 283, the item engagement systems 285, the sensors 282, the power modules 284 and/or the navigation modules 286, e.g., by receiving, generating, storing and/or transmitting one or more computer instructions to such components. The control system 280 may communicate with the marketplace 210, the customer 220, the fulfillment center 230 and/or the mobile intermodal delivery system 240, over the network 290, as indicated by line 278, through the sending and receiving of digital data. In some embodiments, the control system 280 may be integrated with or include the processor 272.

The propulsion motors 281 may be any type or form of motor (e.g., electric, gasoline-powered or any other type of motor) capable of generating sufficient rotational speeds of one or more propellers or other components to provide lift and/or thrust forces to the aerial vehicle 270 and any engaged payload, and to aerially transport the engaged payload thereby. For example, one or more of the propulsion motors 281 may be a brushless direct current (DC) motor such as an outrunner brushless motor or an inrunner brushless motor. The aerial vehicle 270 may include any number of such propulsion motors 281 of any kind. For example, one or more of the motors 281 may be aligned or configured to provide forces of lift to the aerial vehicle 270, exclusively, while one or more of the propulsion motors 281 may be aligned or configured to provide forces of thrust to the aerial vehicle 270, exclusively. Alternatively, one or more of the propulsion motors 281 may be aligned or configured to provide forces of lift and forces of thrust to the aerial vehicle 270, as needed. For example, the propulsion motors 281 may be fixed in their orientation on the aerial vehicle 270, or configured to vary their respective orientations, e.g., a tilt-rotor aircraft. Moreover, the propulsion motors 281 may be aligned or configured to operate with different capacities or ratings, or at different speeds, or coupled to propellers having different sizes and shapes.

The control surfaces 283 may be one or more fixed or movable (e.g., repositionable or reorientable) control surfaces such as wings, rudders, ailerons, elevators, flaps, brakes or slats, or other features for controlling or changing a course, an altitude or an attitude (e.g., a yaw, a pitch or a roll) of the aerial vehicle 270.

The item engagement systems 285 may be any mechanical component, e.g., a robotic arm, for engaging an item or for disengaging the item, as desired. For example, when the aerial vehicle 270 is tasked with delivering items from the mobile intermodal delivery system 240, the item engagement system 285 may receive an item from the engagement system 258 of the intermodal carrier vehicle 250, and depart the intermodal carrier vehicle 250 for a location to which the items are to be delivered. The item engagement systems 285 may then be used to deposit the items at the location, and to engage with one or more other items upon a return of the aerial vehicle 270 to the intermodal carrier vehicle 250. The item engagement systems 285 may include any number of controllers, arms, end effectors, drive systems and/or sensors for receiving one or more items, for repositioning the one or more items with respect to a frame or other structure of the aerial vehicle 270, and for depositing the one or more items at a desired location.

The sensors 282 may be any components or other features for capturing information or data during the operation of the aerial vehicle 270, including but not limited to one or more position sensors (e.g., GPS system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 282 may include any number of memory or storage components and processors, photosensitive surfaces, filters, chips, electrodes, clocks, boards, timers or any other relevant features (not shown) for aiding in their operation.

The power modules 284 may be any type of power source for providing electrical power, mechanical power or other forms of power in support of one or more electrical or mechanical loads aboard the aerial vehicle 270. In some embodiments, the power modules 284 may include one or more batteries or other power cells, e.g., dry cell or wet cell batteries such as lead-acid batteries, lithium ion batteries, nickel cadmium batteries or nickel metal hydride batteries, or any other type, size or form of batteries. The power modules 284 may each have any cell voltages, peak load currents, charge times, specific energies, internal resistances or cycle lives, or other power ratings. The power modules 284 may also be any type, size or form of other power source, e.g., other than a battery, including but not limited to or more fuel cells, turbines, solar cells or nuclear reactors. Alternatively, the power modules 284 may be another form of prime mover (e.g., electric, gasoline-powered or any other type of motor) capable of generating sufficient mechanical forces for the aerial vehicle 270.

The navigation modules 286 may include one or more software applications or hardware components including or having access to information or data regarding aspects of transportation systems within a given region, including the locations, dimensions, capacities, conditions, statuses or other attributes of various paths or routes in the region (e.g., one or more sets of rails, roads or shipping channels). For example, the navigation modules 286 may receive inputs from the sensors 282, e.g., from a GPS receiver, an imaging device or another sensor, and determine an optimal direction and/or an optimal speed of the aerial vehicle 270 for travelling on a given path or route based on such inputs. The navigation modules 286 may select a path or route to be traveled by the aerial vehicle 270, and may provide information or data regarding the selected path or route to the control system 280.

Although the block diagram 200 of FIGS. 2A and 2B includes single boxes corresponding to the marketplace 210, the customer 220, the fulfillment center 230, the mobile intermodal delivery system 240, the powered vehicle 245, the intermodal carrier vehicle 250, the intermodal maintenance vehicle 260 and the aerial vehicle 270, those of ordinary skill in the pertinent arts will recognize that the system 200 may include any number of marketplaces, fulfillment centers, customers, mobile intermodal delivery systems, powered vehicles, intermodal carrier vehicles, intermodal maintenance vehicles and/or aerial vehicles for performing one or more of the operations disclosed herein, each of which may include features that are identical to one another, or may be customized in any manner.

Any combination of networks or communications protocols may be utilized in accordance with the systems and methods of the present disclosure. For example, each of the mobile intermodal delivery systems 240 and/or the respective powered vehicles 245, intermodal carrier vehicles 250 and/or intermodal maintenance vehicles 260 and each of the aerial vehicles 270 may be configured to communicate with one another or with the marketplace server 212, the customer computer 222 and/or the fulfillment center server 232 via the network 290, such as is shown in FIGS. 2A and 2B, e.g., via an open or standard protocol such as Wi-Fi. Alternatively, each of the mobile intermodal delivery systems 240 and/or the respective powered vehicles 245, intermodal carrier vehicles 250 and/or intermodal maintenance vehicles 260 and each of the aerial vehicles 270 may be configured to communicate with one another directly outside of a centralized network, such as the network 290, e.g., by a wireless protocol such as Bluetooth, in which two or more of the mobile intermodal delivery systems 240 and/or the respective powered vehicles 245, intermodal carrier vehicles 250 and/or intermodal maintenance vehicles 260 and each of the aerial vehicles 270 may be paired with one another.

The aerial vehicles 270 may be configured to be programmed with one or more sets of instructions for performing any number of missions in accordance with the present disclosure. Such instructions may include a general description and/or coordinates of a departure point, a delivery point (e.g., a location to which an item is to be delivered or from which the item is to be retrieved) or a rendezvous point or, alternatively, one or more sets of specific instructions for causing the aerial vehicles 270 to travel on predetermined courses or at predetermined speeds or altitudes. Moreover, the aerial vehicles 270 may also be configured to be programmed with one or more sets of instructions associated with contingency planning, such as when an aerial vehicle 270 arrives at a predetermined location earlier than intended, or when an aerial vehicle 270 is expected to arrive at a predetermined location later than intended, based on one or more unanticipated or unexpected events or circumstances that may be encountered by the mobile intermodal delivery system 240 and/or the aerial vehicle 270 while the aerial vehicle 270 is in flight.

In some embodiments of the present disclosure, the aerial vehicles 270 and the intermodal carrier vehicles 250 and/or the intermodal maintenance vehicles 260 may be configured to communicate with one another during landing and/or takeoff operations. For example, because vehicles such as rail cars, container ships or trailers typically engage in rocking, rolling or other motion, such as hunting oscillation or other patterned motion, while traveling along a path, instructing an aerial vehicle to take off from or land within an intermodal carrier vehicle or an intermodal mechanical vehicle may be particularly challenging. Accordingly, the information or data gathered by one or more sensors carried aboard the aerial vehicles 270 and/or the intermodal carrier vehicles 250 or the intermodal maintenance vehicles 260 may be shared between the respective vehicles in determining one or more instructions for causing the aerial vehicles 270 to take off therefrom or land therein, and may be provided to one or more servers, processors or other computer devices configured to execute one or more artificial intelligence, fuzzy logic or other algorithms, or otherwise configured to respond to any oscillations, variations or other anticipated or unanticipated changes to absolute or relative positions of the intermodal carrier vehicles 250 or the intermodal maintenance vehicles 260 and the aerial vehicles 270 with respect to one another.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "customer," a "fulfillment center," a "mobile intermodal delivery system" (or a "powered vehicle," an "intermodal carrier vehicle" or an "intermodal maintenance system"), or like terms, may be automated steps performed by their respective computer systems, or implemented within software modules (or computer programs) executed by one or more general purpose computers. Moreover, process steps described as being performed by a "marketplace," a "customer," a "fulfillment center," a "mobile intermodal delivery system" (or a "powered vehicle," an "intermodal carrier vehicle" or an "intermodal maintenance system"), or like terms, may be typically performed by a human operator, but could, alternatively, be performed by an automated agent.

The marketplace 210, the customer 220, the fulfillment center 230, the mobile intermodal delivery system 240 and/or the aerial vehicle 270 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, in some embodiments, the fulfillment center 230 and/or the server 232 may be adapted to transmit information or data in the form of synchronous or asynchronous messages to the marketplace 210 and/or the server 212, the customer 220 and/or the computing device 222, the mobile intermodal delivery system 240 or the aerial vehicle 270, or any other computer device in real time or in near-real time, or in one or more offline processes, via the network 290. Those of ordinary skill in the pertinent art would recognize that the marketplace 210, the customer 220, the fulfillment center 230, the mobile intermodal delivery system 240 and/or the aerial vehicle 270 may operate any of a number of computing devices that are capable of communicating over the network, including but not limited to set-top boxes, personal digital assistants, digital media players, web pads, smartphones, tablet computers, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, the mobile intermodal delivery systems of the present disclosure may be utilized to fulfill orders for deliveries of one or more items to customers. In particular, mobile intermodal delivery systems may be loaded with one or more items and one or more aerial vehicles, and dispatched throughout a transportation network (e.g., rails, shipping channels and/or waterways, or highways). When an order for the delivery of an item to a location is received, a mobile intermodal delivery system having the item may be identified, and the order may be assigned to the mobile intermodal delivery system for fulfillment. The item may then be automatically loaded onto an aerial vehicle, which may then depart the mobile intermodal delivery system and travel to the location to deposit the item there. The aerial vehicle may then return to the mobile intermodal delivery system, e.g., at a rendezvous point, where the aerial vehicle may remain available to fulfill another order, or may receive one or more maintenance, repairs or servicing operations.

At box 310, a mobile carrier system having an intermodal maintenance vehicle and an intermodal carrier having an unmanned aerial vehicle and one or more items aboard is in transit within a region. For example, in some embodiments, such as is shown in FIGS. 1A through 1L, one or more of the intermodal carrier vehicles 150 may be pulled, pushed or otherwise caused to travel along the tracks 125 by the powered vehicle 145, and may be coupled to one or more intermodal maintenance vehicles 160. At box 320, an order for delivery of an item aboard the intermodal carrier to a location in the region is received, e.g., by an online marketplace or other electronic platform, from a customer over a network. In some embodiments, the intermodal carrier may be the only available source of the item. In other embodiments, the intermodal carrier may be selected on any relevant basis, including but not limited to the proximity of the intermodal carrier to the location in the region, the operational capacity of one or more unmanned aerial vehicles thereon to fulfill the order (e.g., the types, classes, sizes or capacities of the aerial vehicles on the intermodal carrier, or any other operational commitments to which the intermodal carrier may be dedicated), prevailing environmental conditions, or on any other factor. For example, the intermodal carrier and/or one or more of the aerial vehicles therein may be selected based at least in part on a minimum net cost, distance and/or time required to fulfill the order thereby.

At box 330, the item is loaded onto the unmanned aerial vehicle. In some embodiments, the intermodal carrier may include a single unmanned aerial vehicle that may be available for deliveries of items from the intermodal carrier to one or more destinations. In other embodiments, however, the intermodal carrier may include a plurality of unmanned aerial vehicles that may be available for deliveries of items. In such embodiments, the unmanned aerial vehicle onto which the item is loaded may be selected on any basis, including an available power level, a speed rating, a noise rating, or any other factor, e.g., a minimum net cost, distance and/or time required to fulfill the order thereby, as well as an operating range, a power rating or a carrying capacity. Alternatively, the unmanned aerial vehicle may be selected at random, or may be the next available unmanned aerial vehicle for performing a delivery.

At box 340, launch conditions may be established within the intermodal carrier. For example, in some embodiments, a course and/or a speed of a powered vehicle may be changed, as necessary, in order to generate optimal wind conditions for launch outside of the intermodal carrier. In some other embodiments, the intermodal carrier may be outfitted with one or more ducts, vents, intakes or outlets that enable air flow to enter the intermodal carrier vehicle, to travel therethrough at desired velocities and/or pressures, and/or to exit from the intermodal carrier vehicle. In some other embodiments, the intermodal carrier may include one or more heaters, chillers, humidifiers and/or dehumidifiers to establish one or more desired temperatures and/or humidity levels within the intermodal carrier prior to launch.

At box 345, the intermodal carrier opens to permit the unmanned aerial vehicle to launch therefrom, and, after the unmanned aerial vehicle has cleared the intermodal carrier, at box 355, the intermodal carrier closes. For example, the intermodal carrier may include one or more doors, e.g., split doors that may open side-to-side, or front and back, or, alternatively, slidable or rollable doors that may open forward-to-aft or aft-to-forward. The intermodal carrier may further include one or more launching or retrieval systems for lifting or expelling the unmanned aerial vehicle out of the intermodal carrier, such as elevators, pulleys, lifts, catapults or other systems.

At box 360, after having cleared the intermodal carrier, the unmanned aerial vehicle departs for the location specified in the order while the mobile delivery system remains in transit, e.g., on a set of rails, in a shipping channel and/or on a roadway. The unmanned aerial vehicle may be programmed with general or specific instructions for causing the unmanned aerial vehicle to travel on a desired course, or at a desired speed or altitude, or in accordance with any other operating characteristic. Alternatively, or additionally, the unmanned aerial vehicle may be programmed with general or specific instructions for responding to one or more contingencies or other factors that may be encountered while the unmanned aerial vehicle is in transit. At box 365, whether the delivery operation is complete is determined. If the delivery operation is not complete, then the process returns to box 360, where the intermodal carrier remains in transit while the unmanned aerial vehicle is en route to the location. If the delivery operation is complete, however, then the process advances to box 370, where the unmanned aerial vehicle returns to the intermodal carrier, e.g., at a designated or predetermined rendezvous point that may be selected based on a variety of factors including but not limited to a course and speed of the intermodal carrier, the location where the item was delivered, operational capacities and/or constraints of the intermodal carrier and/or the unmanned aerial vehicle, or any other relevant factor.

At box 375, whether the unmanned aerial vehicle requires servicing is determined. For example, the unmanned aerial vehicle may have a low battery level, or may require scheduled and/or preventive maintenance or inspections. Alternatively, one or more propulsion motors, propellers or other components may be radiating abnormal or high levels of noise, or may be observed to be performing at substandard or unacceptable levels. If the unmanned aerial vehicle requires servicing, then the process advances to box 385, where an intermodal maintenance vehicle opens to receive the unmanned aerial vehicle therein. As is discussed above, the intermodal maintenance vehicle may include the same numbers and/or types of doors as the intermodal carrier vehicle, or different numbers or types of doors, which may be operated in the same manner as the doors of the intermodal carrier vehicle at box 350 or in a different manner. At box 390, one or more servicing operations (e.g., maintenance, repairs, inspections or any other relevant evolutions relating to the air-worthiness of the aerial vehicle) are performed, and the process ends. Alternatively, in some embodiments, when the unmanned aerial vehicle requires servicing, the unmanned aerial vehicle may be routed not to a mobile intermodal delivery system from which it was launched but to an alternate destination that may be specifically configured to perform the servicing operations that may be required, e.g., another mobile intermodal delivery system and/or a fixed facility, before returning to the intermodal carrier from which the unmanned aerial vehicle was launched.

If the aerial vehicle does not require servicing, however, then the process advances to box 380, where the intermodal carrier reopens to receive the unmanned aerial vehicle therein, and the process ends.

As is discussed above, the intermodal carrier vehicles and/or the intermodal maintenance vehicles of the present disclosure may be formed from one or more intermodal containers and may utilize any type of form of doors or other portals for enabling aerial vehicles to launch from or return to compartments therein. Referring to FIGS. 4A through 4D, views of aspects of one mobile intermodal delivery system in accordance with embodiments of the present disclosure is shown. Except where otherwise noted, reference numerals preceded by the number "4" in FIGS. 4A through 4D refer to elements that are similar to elements having reference numerals preceded by the number "2" in FIG. 2A or FIG. 2B or by the number "1" shown in FIGS. 1A through 1L.

Figure 4A:
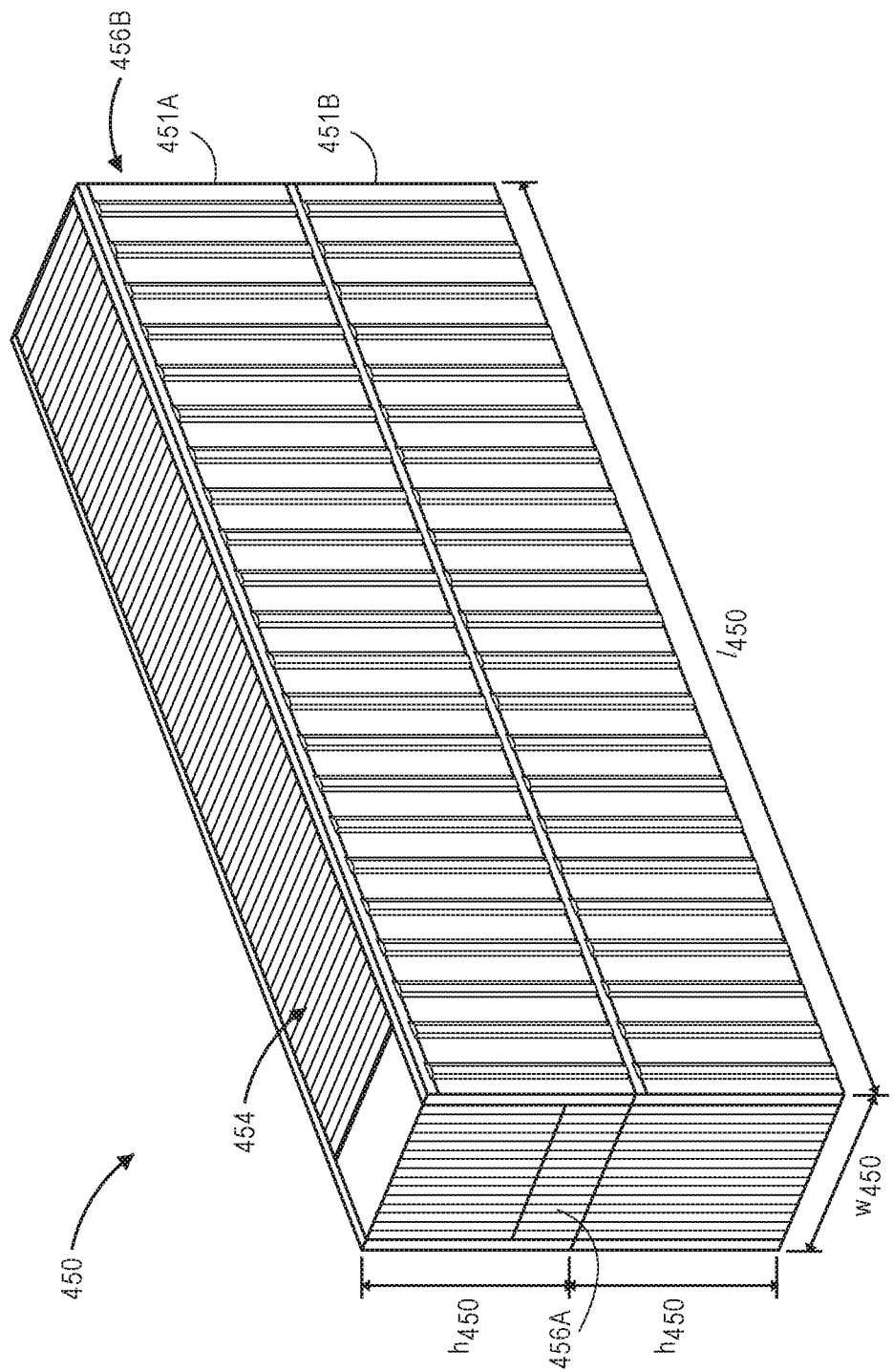
FIGS. 4A through 4D are views of aspects of one mobile intermodal delivery system in accordance with embodiments of the present disclosure.

As is shown in FIG. 4A, an intermodal carrier 450 includes a pair of intermodal containers 451A, 451B that are stacked atop one another and configured for placement aboard a well car, a container ship, a trailer or another carrier and pushed, pulled or carried by any type of powered vehicle. Each of the intermodal containers 451A, 451B features corrugated sides and has a height $h_{450}$, a width $w_{450}$ and a length $l_{450}$. Additionally, the upper intermodal container 451A includes a slidable door (e.g., a roller shutter door) 454, a forward intake duct 456A and an aft outlet duct 456B. Alternatively, the intermodal carrier 450 may include any number of other doors including one or more doors that may open side-to-side, forward-to-aft or aft-to-forward. Thus, the intermodal carrier 450 of FIG. 4A has a height of $2h_{450}$ when the intermodal containers 451A, 451B are stacked atop one another. The intermodal containers 451A, 451B may be selected on any basis, including whether the height $2h_{450}$, the width $w_{450}$ and the length $l_{450}$ of the intermodal carrier 450 may be accommodated by the infrastructure associated with one or more transit modes, e.g., heights of bridges, tunnels or other features, or on any other factor. For example, in some embodiments, the intermodal containers 451A, 451B may have been previously utilized in connection with one or more items to a predetermined destination, and may be repurposed for use as an intermodal carrier or, alternatively, as an intermodal maintenance vehicle.

Figure 4B:
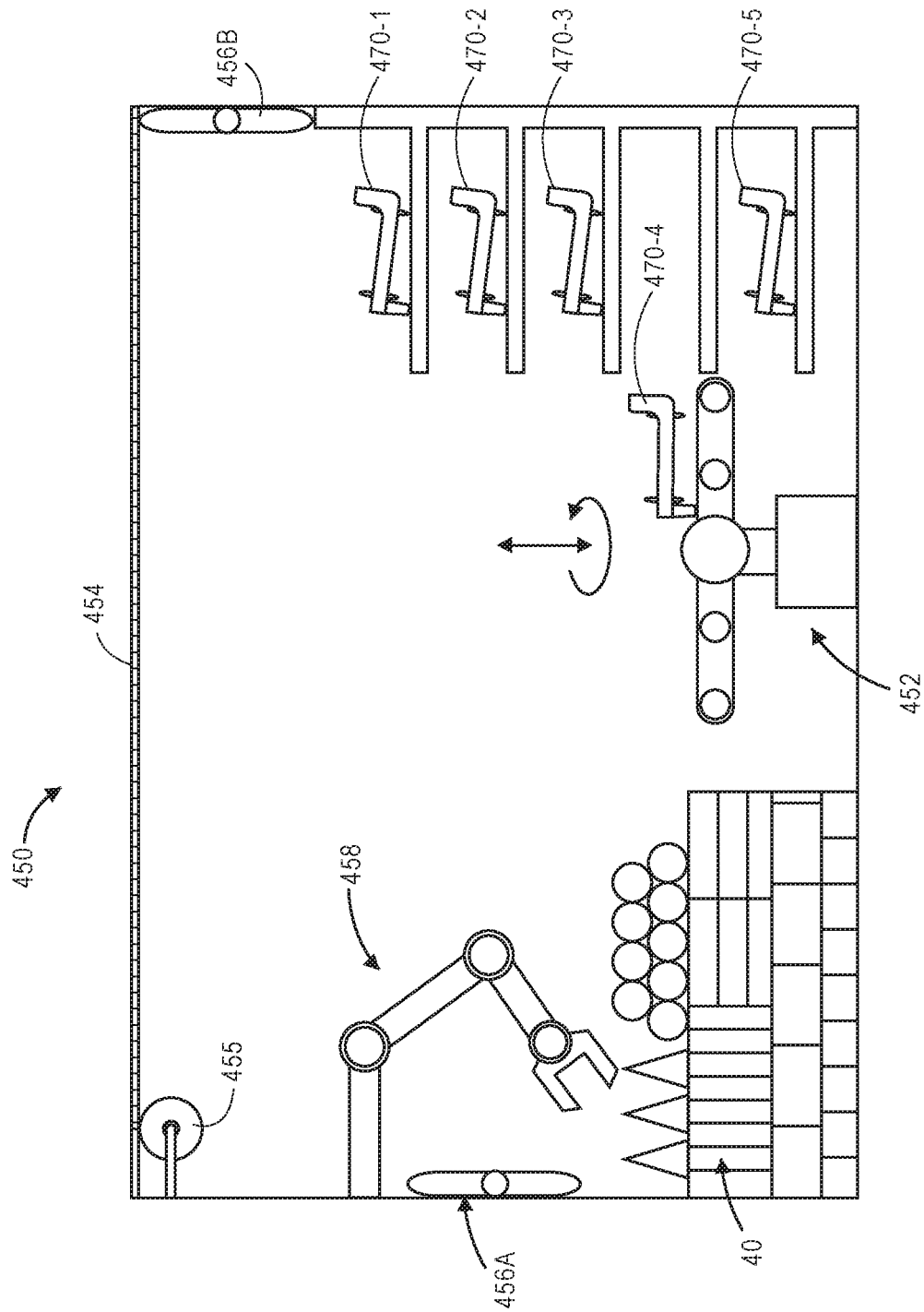
Figure 4C:
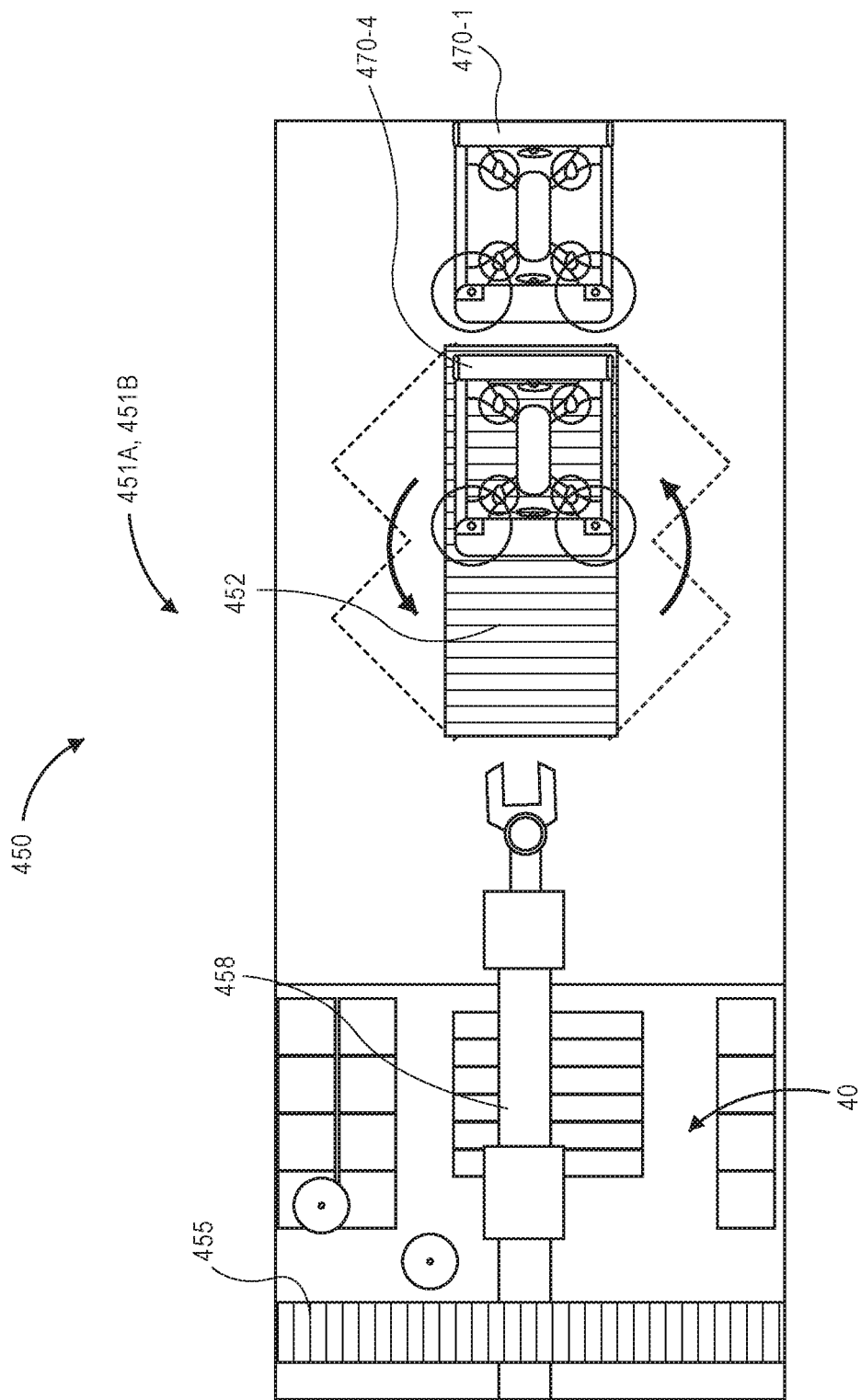

As is shown in FIG. 4B and FIG. 4C, a view of an interior compartment of the intermodal carrier 450 shows a plurality of items 40, a launch and retrieval system 452, a motorized roller (e.g., a tubular roller) 455 for retracting or extending the slidable door 454, an item engagement system 458 and a plurality of aerial vehicles 470-1, 470-2, 470-3, 470-4, 470-5. The aerial vehicles 470-1, 470-2, 470-3, 470-5 are shown in a stack in an aft portion of the intermodal carrier 450. The aerial vehicle 470-4 is shown on the launch and retrieval system 452, which includes a conveyor that extends to the stack of the aerial vehicles 470-1, 470-2, 470-3, 470-5, and may be raised and/or lowered, as necessary, in order to retract one or more of the aerial vehicles 470-1, 470-2, 470-3, 470-5 from the stack. Additionally, the conveyor may be rotated about a vertical axis, e.g., in order to place an aerial vehicle on the conveyor (e.g., the aerial vehicle 470-4) within a range of the item engagement system 458. Alternatively, the interior compartment of the intermodal carrier 450 may further include any number of sensors or other systems or components (not shown), including but not limited to position sensors, imaging devices or other systems that may be used to monitor operations of the intermodal carrier 450 or one or more of the aerial vehicles 470-1, 470-2, 470-3, 470-4, 470-5 therein, or for aiding in their operation.

Figure 4D:
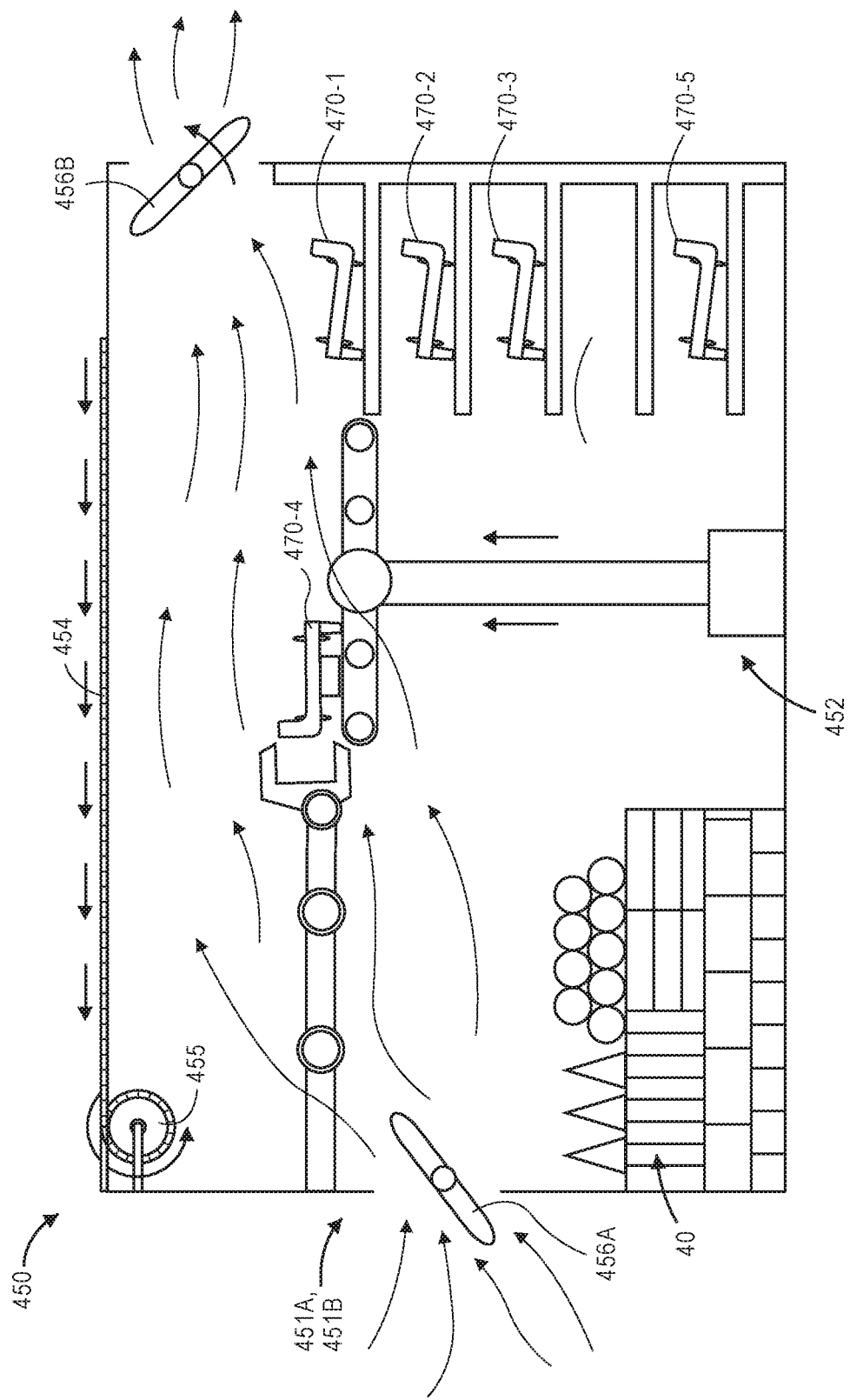

As is shown in FIG. 4D, the intermodal carrier 450 is configured to launch the aerial vehicle 470-4 therefrom, in order to enable the aerial vehicle 470-4 to deliver an item to a predetermined destination. First, an item may be loaded onto the aerial vehicle 470-4 by rotating the conveyor of the launch and retrieval system 452 about a vertical axis, e.g., by approximately one hundred eighty degrees (180°), and raising the conveyor to within a range of the item engagement system 458. Next, preferred launching conditions, such as conditions consistent with an exterior of the intermodal carrier 450, may be established by operating the forward intake duct 456A and the aft outlet duct 456B until a desired air velocity and/or pressure is established within the intermodal carrier 450. Finally, the slidable door 454 may be retracted by the motorized roller 455. Once the slidable door 454 has been retracted to a sufficient extent, the aerial vehicle 470 may take off from the intermodal carrier 450 and deliver one of the items 40 to a predetermined destination. The launch and retrieval system 452 may be further rotated, as necessary, to align the aerial vehicle 470 in a desired orientation prior to takeoff. As is discussed above, the intermodal carrier 450 may be further configured to conduct landing or retrieving operations, such as by operating one or more of the systems disclosed herein in a reverse or reciprocal fashion, and, alternatively, by establishing preferred landing or retrieving conditions within the intermodal carrier 450, as necessary, prior to commencing any landing or retrieving operations.

Figure 5A:
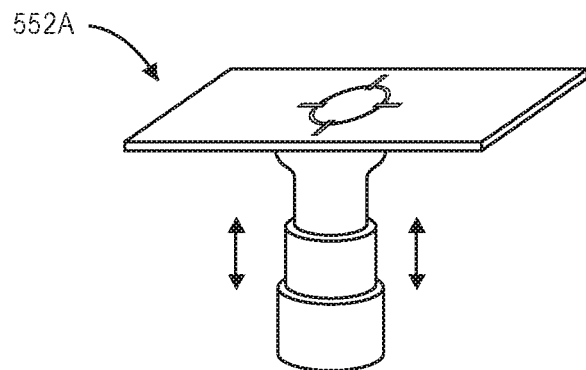
FIGS. 5A through 5C are views of components for use in mobile intermodal delivery systems in accordance with embodiments of the present disclosure.
Figure 5B:
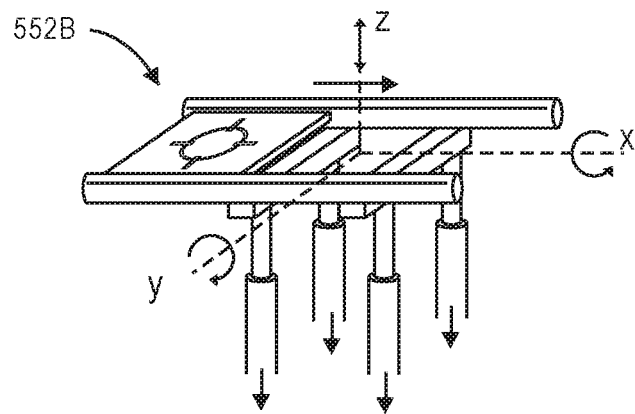
Figure 5C:
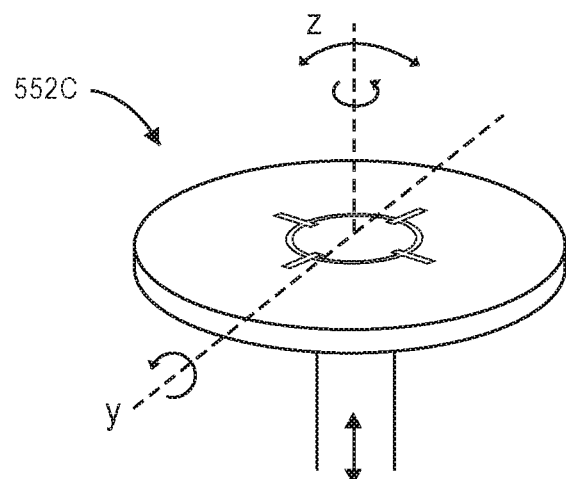

As is discussed above, aerial vehicles may be launched and/or retrieved from a mobile intermodal delivery system using any type of launching and/or retrieval system. Referring to FIGS. 5A through 5C, views of components for use in mobile intermodal delivery systems in accordance with embodiments of the present disclosure are shown. Except where otherwise noted, reference numerals preceded by the number "5" in FIGS. 5A through 5C refer to elements that are similar to elements having reference numerals preceded by the number "4" in FIGS. 4A through 4D, by the number "2" in FIG. 2A or FIG. 2B or by the number "1" shown in FIGS. 1A through 1L.

As is shown in FIG. 5A, a launch and retrieval system 552A includes a substantially rectangular platform that may be raised or lowered, as necessary. For example, the launch and retrieval system 552A of FIG. 5A may be configured to receive an aerial vehicle and/or an item thereon, to raise the aerial vehicle in a desired height within or beyond an intermodal carrier vehicle or intermodal maintenance vehicle for vertical takeoff operations, and to enable the aerial vehicle to be launched therefrom. Reciprocally, the launch and retrieval system 552A may also be used to retrieve an aerial vehicle thereon following operations, to lower the aerial vehicle to a height within the intermodal carrier, and to enable the aerial vehicle to be removed therefrom.

As is shown in FIG. 5B, a launch and retrieval system 552B includes a sliding platform on a pair of rails, each of which is supported by a corresponding pair of hydraulic jacks, pistons or other systems. By independently or collectively operating the hydraulic jacks, pistons or other systems, the pair of rails may be raised in a vertical direction (or along a z-axis, as is shown in FIG. 5B), rotated about a forward axis (or an x-axis, as is shown in FIG. 5B) or rotated about a lateral axis (or a y-axis, as is shown in FIG. 5B), thereby enabling an aerial vehicle placed thereon to be aligned in a variety of orientations prior to takeoff, or during or after landing. Additionally, the sliding platform may be translated in a direction of the forward axis (or the x-axis) in any manner, e.g., by one or more motors, rockets, catapults or other like systems, to impart an additional force in this direction to an aerial vehicle prior to takeoff.

As is shown in FIG. 5C, a launch and retrieval system 552C includes a circular disc that may be rotated about a vertical axis (or a z-axis, as is shown in FIG. 5C), raised or lowered in the direction of the vertical axis, or gimbaled in any direction, thereby enabling an aerial vehicle placed thereon to be aligned in a variety of orientations prior to takeoff, or during or after landing.

Figure 6:
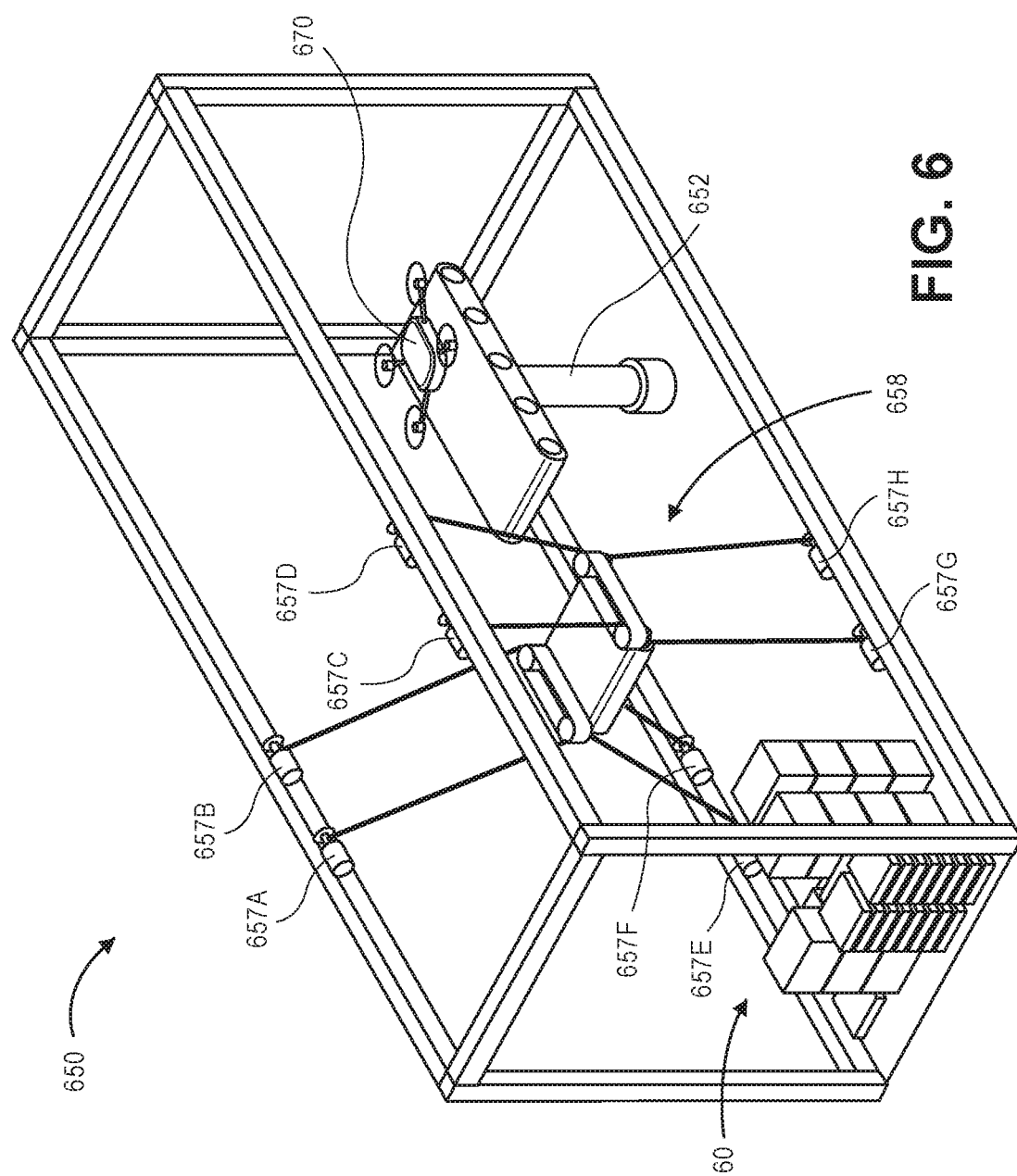
FIG. 6 is a view of aspects of one mobile intermodal delivery system in accordance with embodiments of the present disclosure.

The engagement systems of the present disclosure may include any number of components or features for interacting with one or more items and/or aerial vehicles within an intermodal carrier vehicle and/or within an intermodal maintenance vehicle in accordance with the present disclosure, including but not limited to one or more controllers, arms, end effectors, drive systems and/or sensors or like components or features. Referring to FIG. 6, a view of aspects of one mobile intermodal delivery system in accordance with embodiments of the present disclosure is shown. Except where otherwise noted, reference numerals preceded by the number "6" in FIG. 6 refer to elements that are similar to elements having reference numerals preceded by the number "5" in FIGS. 5A through 5C, by the number "4" in FIGS. 4A through 4D, by the number "2" in FIG. 2A or FIG. 2B or by the number "1" shown in FIGS. 1A through 1L.

FIG. 6 shows an outline of components within a compartment of an intermodal carrier vehicle 650, including but not limited to components that may be installed or mounted within one or more repurposed intermodal containers. As is shown in FIG. 6, the intermodal carrier vehicle 650 includes a plurality of items 60, a launch and retrieval system 652 and an engagement system 658 within a compartment defined by the intermodal carrier vehicle 650. The launch and retrieval system 652 is shown as including a conveyor with an aerial vehicle 670 resting thereon. The engagement system 658 includes a cable robot suspended within the compartment of the intermodal carrier vehicle 650 by a plurality of tensioning actuators 657A, 657B, 657C, 657D, 657E, 657F, 657G, 657H, each of which is mounted to an interior of the intermodal carrier vehicle 650 and connected in tension to the engagement system 658 by way of a cable in tension. In some embodiments, the engagement system 658 may further include a pair of opposed induction conveyors that are substantially vertically aligned and configured to automatically receive an item 60 therebetween on the engagement system 658, and to expel the item 60 therefrom when the engagement system 658 is in a desired position with respect to the launch and retrieval system 652 and/or the aerial vehicle 670. The induction conveyors may be operated by one or more controllers (not shown), and may be provided in any other relevant alignment that permits items to be fixed therebetween or onto the engagement system 658 in another manner, and to be expelled from the engagement system 658 thereby, including but not limited to substantially horizontal alignments, or alignments at one or more non-horizontal and non-vertical angles.

Although the components such as the intermodal containers 451A, 451B, the launch and retrieval platform 452, the slidable door 454, the ducts 456A, 456B and the item engagement system 458 shown in FIGS. 4A through 4D or the engagement system 658 of FIG. 6 are utilized in connection with an intermodal carrier, those of ordinary skill in the pertinent arts will recognize that one or more of such components may be utilized in connection with an intermodal maintenance vehicle, or in connection with a combined intermodal vehicle that includes both item carrying and maintenance capacities or features. Additionally, those of ordinary skill in the pertinent arts will recognize that an intermodal carrier vehicle and/or an intermodal maintenance vehicle may include one or more launch and retrieval systems, including one or more of the systems 152, 162, 452, 552A, 552B, 552C, 652 shown in FIGS. 1B, 1C, 1E-1G, 1L, 4B-4D, 5A-5C and 6, or other such systems. Alternatively, in some embodiments, an intermodal carrier vehicle and/or an intermodal maintenance vehicle may include separate systems for launching and/or retrieving aerial vehicles.

Figure 7:
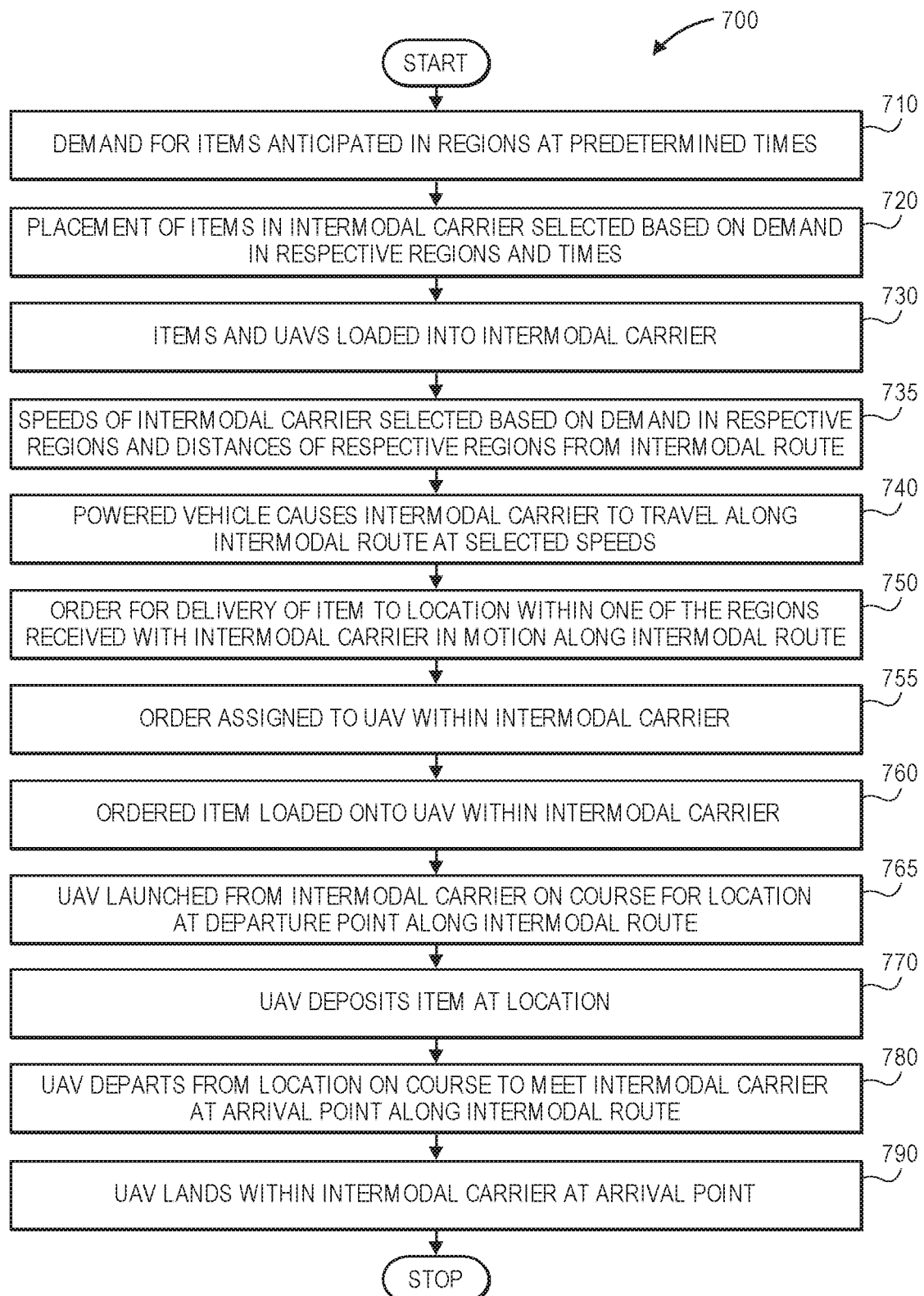
FIG. 7 is a flow chart of one process for operation of a mobile intermodal delivery system in accordance with embodiments of the present disclosure.

As is discussed above, in some embodiments, the systems and methods of the present disclosure may be used to distribute, or forward-deploy, inventory from one location to another location where demand for such items is known, observed or predicted, using intermodal carriers that include such items and one or more aerial vehicles. The intermodal carriers of the present disclosure may ultimately act as a mobile fulfillment center, and place one or more items within a shorter distance and a shorter time of delivery of customers along transit modes such as railroads, shipping channels and/or highways. Referring to FIG. 7, a flow chart 700 of one process for operation of a mobile intermodal delivery system in accordance with embodiments of the present disclosure is shown. At box 710, demand for one or more items is anticipated in regions within an operating range of an unmanned aerial vehicle of an intermodal route (e.g., a railway, a shipping channel, a highway) at one or more predetermined times. For example, in some embodiments, the regional demand for the items may be determined based on prior purchasing or delivering histories of customers in such regions, or demographics to which such customers belong. In other embodiments, the regional demand may also be predicted based on attributes of the respective items, on any upcoming events occurring at the local, regional, national or global events levels, or on any traditional, prevailing or emerging attitudes or mores within the respective regions that may be determined on any basis and using information or data obtained from any source, including but not limited to one or more postings or comments made to social networks, or to details pages for items maintained at an online marketplace or any other locations. In some embodiments, once a level of demand is determined or predicted for a region, the level of demand may be compared to one or more thresholds or limits in order to determine whether the distribution or forward-deployment of items to the region is justifiable or necessary.

At box 720, the placement of the items in an intermodal carrier is selected based on levels of demand in such regions. For example, a number of items and their locations within an intermodal carrier may be selected based on the locations where their demand is anticipated with respect to an intermodal route. Where a train pulling an intermodal carrier is expected to travel within an unmanned aerial vehicle operating range of three regions in series, items that are anticipated to be in demand in the most distant region may be selected for loading into a most distant corner or section of the intermodal carrier, and items that are anticipated to be in demand in the nearest region may be selected for loading into a nearest corner or section of the intermodal carrier, thereby facilitating access to such items at appropriate times, and the loading of such items onto aerial vehicles accordingly.

At box 730, the items and one or more unmanned aerial vehicles are loaded onto the intermodal carrier, and at box 735, speeds for the intermodal carrier are selected based on levels of demand in the respective regions, and distances of the respective regions from the intermodal route. Such speeds may be selected in consideration of travel times for not only the intermodal carrier to arrive at a departure point on an intermodal route but also the aerial vehicle to arrive at one or more locations within the region in anticipation of the demand. For example, where the intermodal carrier is to be placed on a well car and pulled on a set of rails by a locomotive, in anticipation of demand for an item in two hours, a departure point for the aerial vehicle along the set of rails may be selected in order to ensure that the locomotive may reach the departure point, and the aerial vehicle may travel from the departure point to locations where the demand is anticipated, in two hours or less.

At box 740, a powered vehicle causes the intermodal carrier to travel along the intermodal route at the speeds that were selected at box 735. At box 750, an order for a delivery of an item to a location is received while the intermodal carrier is in motion along the intermodal route, e.g., by way of a network site associated with an online marketplace, or a dedicated shopping application operating on a smartphone or other computer device, or by any other means, and at box 755, the order is assigned to an unmanned aerial vehicle within the intermodal carrier. For example, upon receipt of an order for one or more items from a customer, computer devices or resources operated by an online marketplace, a fulfillment center or any other commercial entity may determine that the ordered items are available onboard the intermodal carrier within a given region, and provide one or more instructions to the intermodal carrier, e.g., over a network, to cause the item to be loaded onto an unmanned aerial vehicle within the aerial vehicle prior to reaching a departure point, and to cause the unmanned aerial vehicle to take off from the intermodal carrier when the departure point is reached. The intermodal carrier and/or the aerial vehicle to which the fulfillment of the order is assigned may be selected on any basis, including but not limited to a minimum net cost, a minimum net time or a minimum net distance required in order to fulfill the order, or on any other factor.

At box 765, the unmanned aerial vehicle is launched from the intermodal carrier and heads on a course for the location at a departure point along the intermodal route, which may be selected on any basis. In some embodiments, the departure point may be a closest (e.g., tangential) point between the location and the intermodal route. In other embodiments, the departure point may be selected based on operational considerations and/or constraints of the intermodal carrier and/or the aerial vehicle, or on any other factor. At box 770, the unmanned aerial vehicle deposits the item at the location, and at box 780, the unmanned aerial vehicle departs from the location on a course to meet the intermodal carrier at an arrival point (or a rendezvous point) along the intermodal route. The arrival point may also be selected on any basis, including but not limited to distances between the intermodal route and the location, as well as operational considerations and/or constraints of the intermodal carrier and/or the aerial vehicle, or any other factor. At box 790, the unmanned aerial vehicle lands within the intermodal carrier at the arrival point, and the process ends. Thereafter, the unmanned aerial vehicle may be subjected to one or more maintenance, repairs or servicing evolutions before being loaded with one or more additional items and utilized in connection with another delivery.

Figure 8:
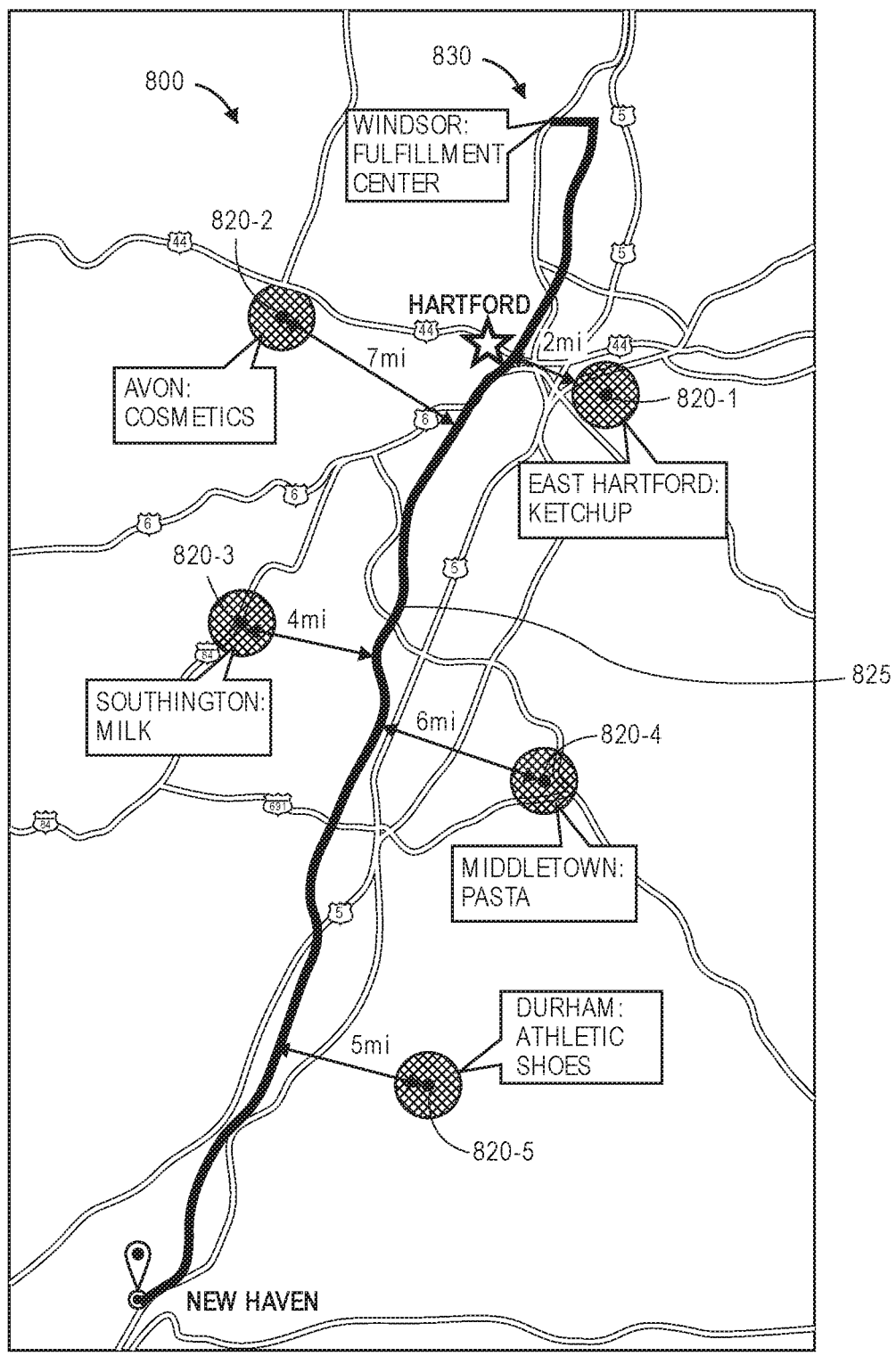
FIG. 8 is a view of aspects of operation of one mobile intermodal delivery system in accordance with embodiments of the present disclosure.

Items may be deployed in intermodal carriers along any route associated with a transportation system, e.g., on one or more sets of rails, roads and/or shipping channels, and based on any levels of demand that may be anticipated for such items in regions or areas within a vicinity (e.g., an operating range of an unmanned aerial vehicle carried aboard the intermodal carriers) of the route. Referring to FIG. 8, a view of aspects of operation of one mobile intermodal delivery system in accordance with embodiments of the present disclosure is shown. Except where otherwise noted, reference numerals preceded by the number "8" in FIG. 8 refer to elements that are similar to elements having reference numerals preceded by the number "6" in FIG. 6, by the number "5" in FIGS. 5A through 5C, by the number "4" in FIGS. 4A through 4D, by the number "2" in FIG. 2A or FIG. 2B or by the number "1" shown in FIGS. 1A through 1L.

As is shown in FIG. 8, a region 800 (viz., central Connecticut) is serviced by a variety of transportation modes or systems, including a rail line 825. Demand for one or more items within areas in close proximity to the rail line 825 may be predicted. For example, as is shown in FIG. 8, an area 820-1 (viz., East Hartford, Conn.) where a predicted demand for ketchup has been identified is located approximately two miles from the rail line 825 at its shortest distance. Similarly, an area 820-2 (viz., Avon, Conn.) where a predicted demand for cosmetics has been identified is located approximately seven miles from the rail line 825 at its shortest distance. An area 820-3 (viz., Southington, Conn.) where a predicted demand for milk has been identified is located approximately four miles from the rail line 825 at its shortest distance. Areas 820-4, 820-5 (viz., Middletown, Conn., and Durham, Conn.) where predicted demands for pasta and athletic shoes have been identified are located approximately six and five miles, respectively, from the rail line 825 at their shortest distances.

Therefore, in accordance with some embodiments of the present disclosure, and as is shown in FIG. 8, one or more intermodal carriers (not shown) may be loaded with bottles of ketchup, compact containers, cartons of milk, boxes of pasta and/or pairs of athletic shoes at a fulfillment center 830, along with one or more aerial vehicles (not shown). The intermodal carriers may then be placed onto well cars and coupled to one or more locomotives or other powered vehicles, and caused to travel south along the rail line 825. In anticipation for receiving one or more orders for such items, or after receiving such orders, one or more aerial vehicles may be loaded with the respective items and launched in directions of the areas 820-1, 820-2, 820-3, 820-4, 820-5, or in directions of locations where such items are to be delivered. After the items have been delivered, the aerial vehicles may return to the intermodal carriers and be loaded with one or more additional items for delivery or, alternatively, proceed to an intermodal maintenance vehicle for repairs or other servicing operations.

Figure 9A:
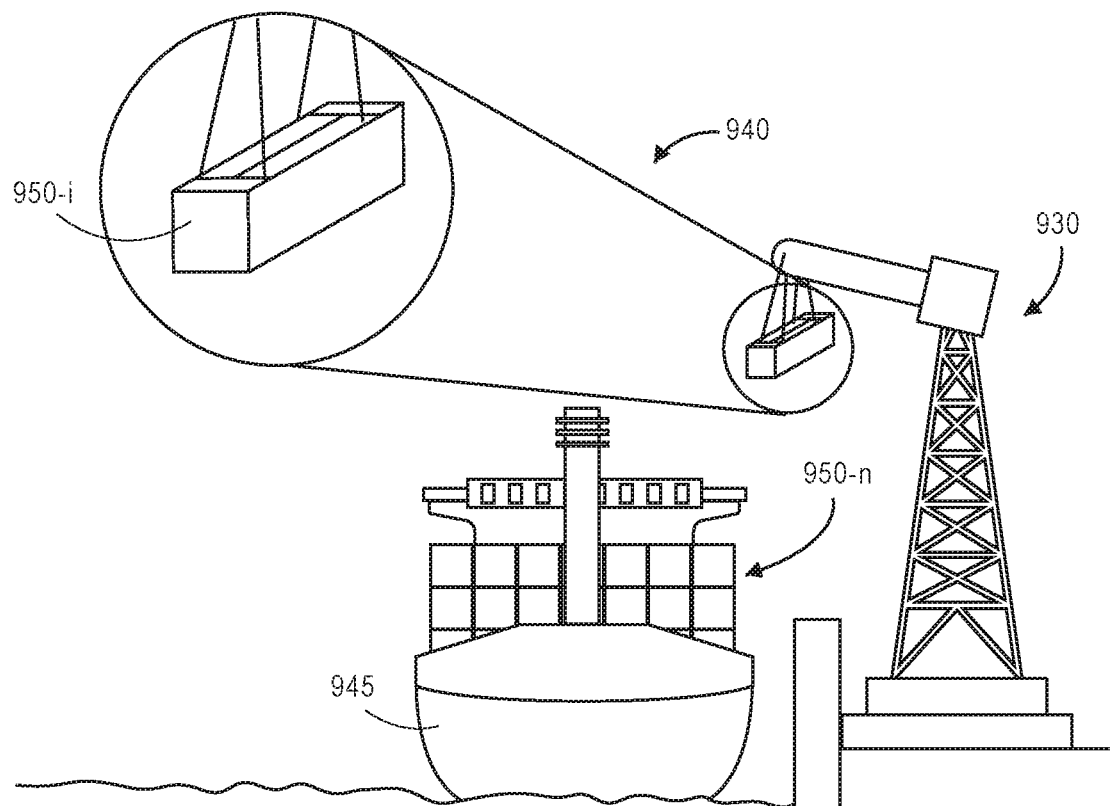
FIGS. 9A and 9B are views of aspects of operation of mobile intermodal delivery systems in accordance with embodiments of the present disclosure.
Figure 9B:
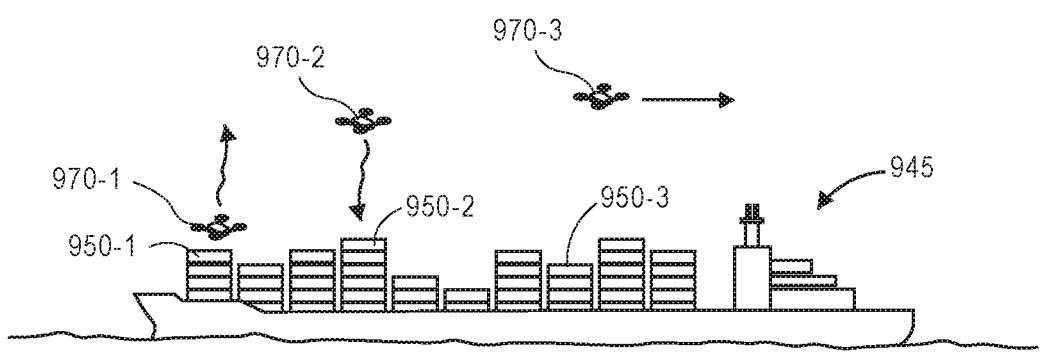

As is discussed above, the intermodal carrier vehicles and/or the intermodal maintenance vehicles of the present disclosure may be utilized in connection with any transit modes, and are not limited to rail-based systems. Referring to FIGS. 9A and 9B, views of aspects of operation of mobile intermodal delivery systems in accordance with embodiments of the present disclosure are shown. Except where otherwise noted, reference numerals preceded by the number "9" in FIG. 9A or 9B refer to elements that are similar to elements having reference numerals preceded by the number "8" in FIG. 8, by the number "6" in FIG. 6, by the number "5" in FIGS. 5A through 5C, by the number "4" in FIGS. 4A through 4D, by the number "2" in FIG. 2A or FIG. 2B or by the number "1" shown in FIGS. 1A through 1L.

As is shown in FIG. 9A, a mobile intermodal delivery system 940 including a container ship 945 may be configured to receive a plurality of intermodal containers 950-n thereon while in port. For example, as is shown in FIG. 9A, an intermodal container 950-i may be loaded onto the container ship 945 by a crane 930. Each of the intermodal containers 950-n may be loaded with a plurality of items and/or one or more aerial vehicles, and may include any number of launch and retrieval mechanisms, doors or other access points, environmental controls or engagement systems.

Subsequently, as is shown in FIG. 9B, after the container ship 945 departs from port, orders for one or more items that are stored within the intermodal containers 950-n and to be delivered within a vicinity of the container ship 945 may be fulfilled using aerial vehicles stored therein, while the container ship 945 is underway. For example, an aerial vehicle 970-1 is shown as lifting off from an intermodal container 950-1, while an aerial vehicle 970-2 is shown as returning to an intermodal container 950-2, and an aerial vehicle 970-3 is as traveling away from an intermodal container 950-3. In some embodiments, an aerial vehicle loaded into an intermodal container may be used to deliver items that are also loaded into the same intermodal container to locations that are within a vicinity of the container ship 945. In other embodiments, however, an aerial vehicle that is loaded into a first intermodal container may be used to deliver items that are loaded into a second intermodal container, e.g., by launching the aerial vehicle from the first intermodal container and by landing the aerial vehicle into the second intermodal container, where the aerial vehicle may be loaded with one or more items before being launched therefrom.

Referring to FIG. 10, a view of aspects of operation of one mobile intermodal delivery system in accordance with embodiments of the present disclosure is shown. Except where otherwise noted, reference numerals preceded by the number "10" in FIG. 10 refer to elements that are similar to elements having reference numerals preceded by the number "9" in FIG. 9A or 9B, by the number "8" in FIG. 8, by the number "6" in FIG. 6, by the number "5" in FIGS. 5A through 5C, by the number "4" in FIGS. 4A through 4D, by the number "2" in FIG. 2A or FIG. 2B or by the number "1" shown in FIGS. 1A through 1L.

As is shown in FIG. 10, a mobile intermodal delivery system 1040 includes a road tractor 1045 configured for towing a road trailer 1043 with an intermodal carrier 1050 placed thereon. As is also shown in FIG. 10, the intermodal carrier 1050 may be configured to launch and retrieve one or more aerial vehicles, such as aerial vehicles 1070-1, 1070-2, while the mobile intermodal delivery system 1040 is in motion on a highway or other roadway. In some embodiments, the mobile intermodal delivery system 1040 may therefore be used to fulfill orders for items within the intermodal carrier 1050 using one or more aerial vehicles, e.g., the aerial vehicles 1070-1, 1070-2, or to forward-deploy inventory to regions where demand for such items is anticipated. Alternatively, or additionally, the road tractor 1045 and/or the road trailer 1043 may be outfitted with an intermodal maintenance vehicle that may perform repairs or other servicing operations on aerial vehicles while the mobile intermodal delivery system 1040 is in motion on a highway or other roadway.

Figure 11:
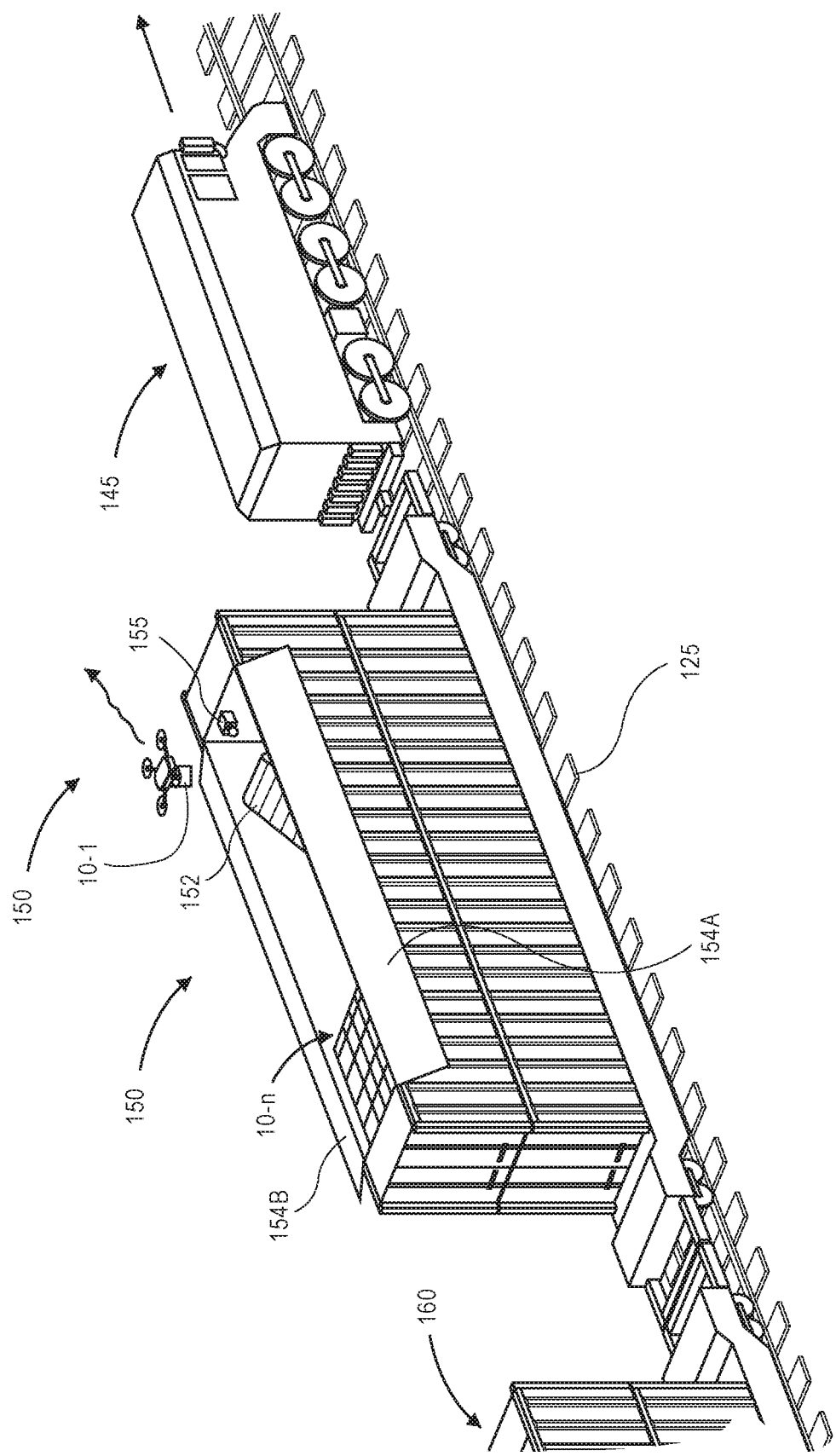
FIG. 11 is a flow chart of one process for operation of a mobile intermodal delivery system in accordance with embodiments of the present disclosure.

As is also discussed above, an intermodal maintenance vehicle may be configured to receive aerial vehicles therein and to perform one or more repairs or other servicing operations on such aerial vehicles, while the intermodal maintenance vehicle is in motion, before returning the aerial vehicles to service when such operations are complete. The intermodal maintenance vehicles may be strategically directed to one or more regions where aerial vehicles flying overhead may be reasonably expected to require services such as replacements of one or more batteries, propellers and/or motors, or one or more inspection evolutions. Referring to FIG. 11, a flow chart 1100 of one process for operation of a mobile intermodal delivery system in accordance with embodiments of the present disclosure is shown. At box 1110, a plurality of anticipated unmanned aerial vehicle routes across one or more areas are determined. Such routes may be identified or predicted on any basis, including based on known routes for such vehicles, on predicted demand for one or more commercial goods that may be delivered by unmanned aerial vehicles within such areas, or on any other factor, such as prevailing weather conditions in such areas.

At box 1115, a powered vehicle is coupled to an intermodal maintenance vehicle at a service station. The intermodal maintenance vehicle may include one or more spare parts, supplies or materials, as well as any type or form of engagement systems for inspecting and/or repairing one or more aerial vehicles therein. In some embodiments, the intermodal maintenance vehicle may be provided in association with one or more intermodal containers and placed on a well car configured for pulling or pushing by a locomotive, such as the intermodal maintenance vehicle 160 of FIGS. 1A through 1L. Alternatively, the intermodal maintenance vehicle may be placed on one or more seagoing vessels, road vehicles, or like systems. Likewise, in some embodiments, the service station may be associated with a fulfillment center, a warehouse or another facility associated with the receipt, storage and distribution of items or the operation of one or more aerial vehicles, or may be operated or maintained independent of such facilities.

At box 1120, an intermodal route through or within operating ranges of the areas of the anticipated unmanned aerial vehicle routes is determined. The intermodal route may include travel on one or more sets of rails, on one or more shipping channels, or on one or more highways, or on a combination of rails, shipping channels or highways, or one or more other transportation systems. Additionally, in some embodiments, the powered vehicle to which the intermodal maintenance vehicle is coupled may be selected based on the intermodal route. For example, where the unmanned aerial vehicle routes are determined to cross over one or more bodies of water, the intermodal maintenance vehicle may be coupled to a container ship or other seagoing vessel. Where the unmanned aerial vehicle routes are determined to cross over densely populated land, the intermodal maintenance vehicle may be coupled to a locomotive or other train car during morning and afternoon rush hours, or periods when highway traffic congestion is expected, and coupled to a trailer or other road vehicle during periods when highway traffic congestion is not expected. Similarly, in some embodiments, the intermodal maintenance vehicle may be uncoupled from a first powered vehicle and coupled to a second powered vehicle, as necessary, even if the first powered vehicle and the second powered vehicle operate via different transit modes.

At box 1125, the powered vehicle departs from the service station on the intermodal route with the intermodal maintenance vehicle coupled thereto, and at box 1130, the powered vehicle transits along the intermodal route with the intermodal maintenance vehicle. The powered vehicle may travel along one or more sets of rails, roads or shipping channels, and on courses and/or at speeds that may be selected on any basis.

At box 1140, whether an unmanned aerial vehicle requires servicing within one or more of the areas through which the intermodal maintenance vehicle travels is determined. For example, the unmanned aerial vehicle may independently determine that servicing is required, e.g., based on one or more sensed conditions or events that may have occurred while the aerial vehicle is in transit, or in accordance with a predetermined maintenance schedule. Alternatively, the unmanned aerial vehicle may transmit one or more electronic messages to an online marketplace, a fulfillment center, a service station, or to one or more facilities associated with aerial vehicles, including but not limited to ground-based facilities and/or mobile facilities, such as one or more mobile intermodal maintenance vehicles. The electronic messages may include information or data regarding a status of the unmanned aerial vehicle, including but not limited to power levels, operating histories, efficiency metrics or other factors. Upon receiving the electronic messages, one or more servers or other computer devices associated with such facilities may determine whether the unmanned aerial vehicle requires servicing, along with any number of other information or data such as date or time when the servicing is required, or a level of urgency associated with the servicing.

If an unmanned aerial vehicle does not require servicing, then the process returns to box 1130, where the intermodal maintenance vehicle may continue to transit along the intermodal route at any desired courses or speeds. In some embodiments, where confidence in an anticipated level of demand is particularly high, the intermodal maintenance vehicle may be brought to a stop, e.g., on a siding alongside a set of rails, in a rest stop or other roadway that bypasses a highway, or in a port or at anchor on a body of water.

If an unmanned aerial vehicle requires servicing, however, then the process advances to box 1150, where a position of a rendezvous point for the unmanned aerial vehicle and the intermodal maintenance vehicle is determined. The rendezvous point may be selected on any basis, including but not limited to the operability and/or capacities of the unmanned aerial vehicle that requires maintenance, distances between the unmanned aerial vehicle and the intermodal maintenance vehicle, maximum operating speeds, any prevailing weather conditions, or any other relevant factor. At box 1160, a course from the unmanned aerial vehicle and a distance from the intermodal maintenance vehicle to the rendezvous point are determined, and at box 1165, the unmanned aerial vehicle and the intermodal maintenance vehicle proceed to the rendezvous point.

At box 1170, the intermodal maintenance vehicle opens to receive the unmanned aerial vehicle therein for servicing. For example, the intermodal maintenance vehicle may include one or more doors (e.g., a split pair of doors) such as the doors 164A, 164B shown in FIG. 1A, 1D or 1K, or one or more slidable or rollable doors, such as is shown in FIGS. 4A through 4D, that may be selectively opened and closed to enable the unmanned aerial vehicle to land within a compartment of the intermodal maintenance vehicle, such as is shown in FIG. 1K. At box 1180, the one or more servicing operations are performed on the unmanned aerial vehicle within the compartment of the intermodal maintenance vehicle. Such servicing operations may include, but are not limited to, maintenance, inspections, evaluations, replacements of one or more parts, or any other evolutions relating to the air-worthiness of the aerial vehicle. At box 1190, the unmanned aerial vehicle departs from the intermodal maintenance vehicle after the servicing operations have been completed, and the process ends.

Although some of the mobile intermodal delivery systems disclosed herein are depicted in use on rails or otherwise in connection with trains, those of ordinary skill in the pertinent arts will recognize that the systems and methods of the present disclosure are not so limited. Rather, the mobile intermodal delivery systems of the present disclosure may utilize any type of vehicle that is configured to transport items from one location (e.g., a fulfillment center or any other type of location) to another location where demand for such items is known, observed or predicted. The mobile intermodal delivery systems of the present disclosure may further include any type of vehicles that are configured to transfer items or materials to a human, a machine or another vehicle, or to receive items or materials from a human, a machine or another vehicle, as necessary. In this regard, the mobile intermodal delivery systems of the present disclosure may include vehicles that are configured to travel by air, by sea, or across outer space, as well as on land, with one or more items and vehicles disposed therein.

Although some of the embodiments discussed above, and represented in one or more of the figures, depict the use of one or more of the embodiments on transportation networks within the United States, those of ordinary skill in the pertinent arts will recognize that such embodiments and their use are not limited to American transportation networks and may instead be utilized in connection with any transportation network located on Earth, any transportation located on any other planet, or any transportation network that extends between Earth and any other planet.

Moreover, although some of the embodiments discussed above, and represented in one or more of the accompanying figures, depict the use of one or more of the embodiments for the delivery of items from a mobile intermodal delivery vehicle in transit to specific destinations by one or more aerial vehicles, those of ordinary skill in the pertinent arts will also recognize that such embodiments may be used in reverse, e.g., for the delivery of items from specific origins to a mobile intermodal delivery vehicle in transit by one or more aerial vehicles. For example, a mobile intermodal delivery system having one or more intermodal carrier vehicles and/or intermodal maintenance vehicles may be routed to areas where a surplus of saleable items is expected to be available from one or more manufacturers, merchants, sellers and/or vendors, or to areas where a surplus of returnable, recyclable or reusable items is expected to be available from one or more users, and may dispatch one or more aerial vehicles to retrieve such saleable and/or returnable, recyclable or reusable items from locations within such areas, as necessary. The intermodal carrier vehicles of the present disclosure may receive such aerial vehicles and unload such items therefrom, and store such items thereon, until the mobile intermodal delivery system reaches an intended destination, and such items may be offloaded therefrom in bulk.

Furthermore, although some of the embodiments of the present disclosure depict the distribution or forward-deployment of inventory of items that are made available to customers through online marketplaces, those of ordinary skill in the pertinent arts will recognize that the systems and methods of the present disclosure are not so limited. Rather, mobile intermodal distribution systems may be used to distribute or forward-deploy inventory that may be made available through traditional commercial channels, e.g., by telephone or in one or more bricks-and-mortar stores, and delivered to customers or designated locations rapidly in response to orders for such items by aerial vehicles included in such systems. Moreover, although some of the embodiments of the present disclosure depict intermodal vehicles and/or aerial vehicles that are small in size, those of ordinary skill in the pertinent arts will recognize that the systems and methods of the present disclosure are not so limited. Rather, intermodal vehicles and/or aerial vehicles may be of any size or shape, and may be configured or outfitted with features that enable the distribution, delivery, retrieval or manufacture of items of any type or kind, and of any size or shape, by way of one or more aerial vehicles, in accordance with the present disclosure.

Although some embodiments of the present disclosure show the distribution or forward deployment of items that are available for purchase from an online marketplace to one or more locations based on known, observed or predicted demand using mobile intermodal delivery systems having aerial vehicles stored therein, the systems and methods of the present disclosure are not so limited. Rather, the systems and methods of the present disclosure may be utilized in any environment where the improved distribution of items, or the efficient retrieval and reuse of items or materials, is desired. For example, in one embodiment, the mobile intermodal delivery systems and aerial vehicles may be utilized in trash hauling or recycling systems.

Figure 3:
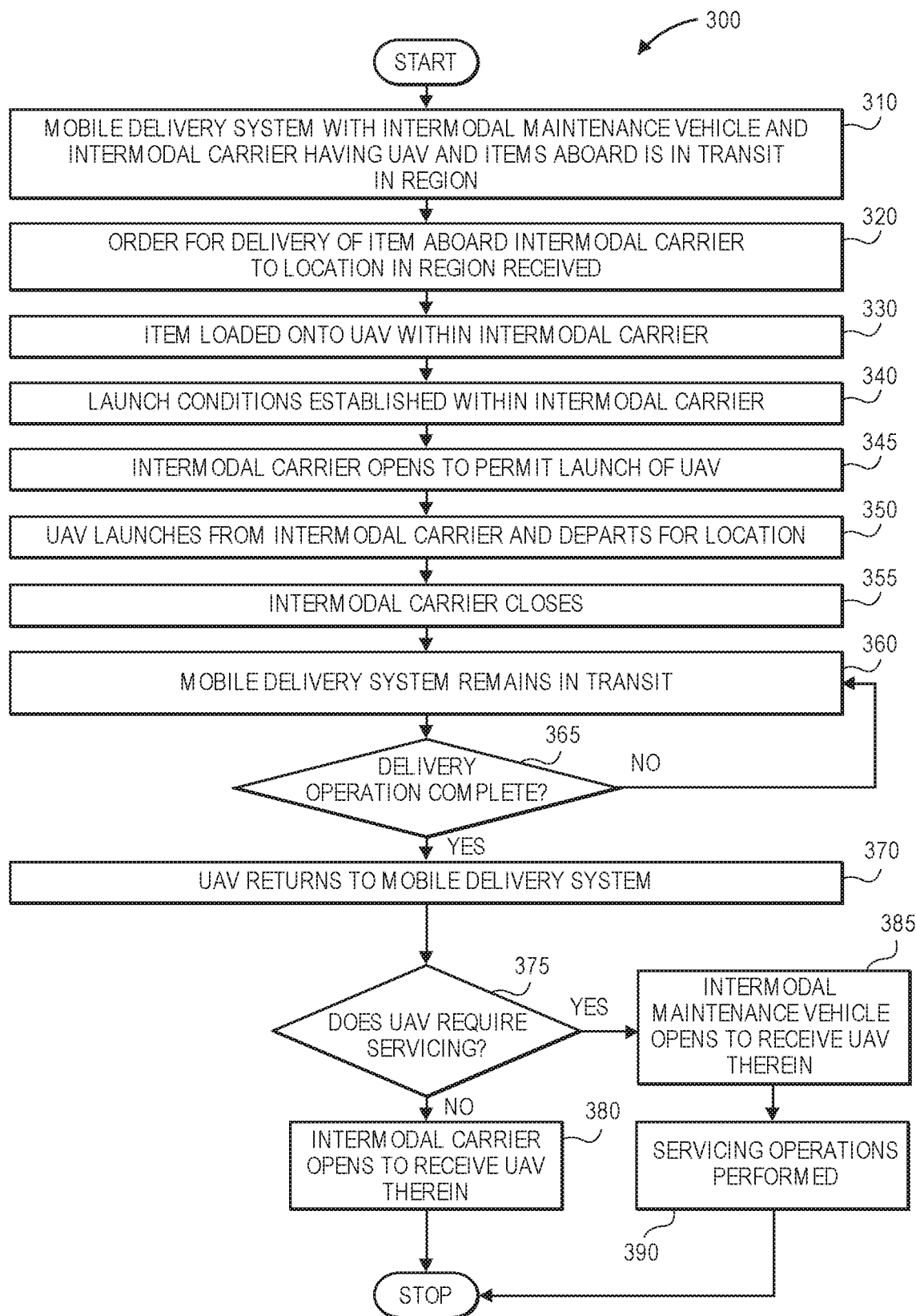
FIG. 3 is a flow chart of one process for operation of a mobile intermodal delivery system in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 7 or 11, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A distribution system comprising:
    a plurality of locomotives;
    a plurality of intermodal carriers, wherein each of the intermodal carriers is coupled to one of the plurality of locomotives, and wherein each of the intermodal carriers comprises:
        a compartment;
        a plurality of items within the compartment;
        an aerial vehicle disposed within the compartment; and
        at least one computer system;
    at least one server in communication with each of the intermodal carriers,
    wherein the at least one server is programmed with one or more sets of instructions that, when executed, cause the at least one server to at least:
    receive an order for a delivery of a first item to a location;
    determine that the first item is one of the plurality of items within the compartment of a first intermodal carrier, wherein the first intermodal carrier is one of the plurality of intermodal carriers;
    transmit, to the first intermodal carrier, an instruction to cause the first item to be delivered to the location; and
    in response to receiving the instruction, the first intermodal carrier is configured to:
        cause at least the first item to be loaded onto a first aerial vehicle disposed within the compartment of the first intermodal carrier;
        cause the first aerial vehicle to depart from the first intermodal carrier; and
        cause the first aerial vehicle to execute the delivery of at least the first item to the location.

2. The distribution system of claim 1, wherein the order is received at a first time,
    wherein each of the plurality of intermodal carriers is in motion at the first time, and
    wherein the one or more sets of instructions, when executed, further cause the at least one server to at least:
    determine that the first item is within compartments of each of a subset of the plurality of intermodal carriers, wherein the first intermodal carrier is one of the subset of the plurality of intermodal carriers;
    determine positions of each of the subset of the plurality of intermodal carriers at the first time;
    determine, for each of the subset of the plurality of intermodal carriers, at least one of:
        a net distance for a delivery of the first item from the position of the intermodal carrier to the location;
        a net time for the delivery of the first item from the position of the intermodal carrier to the location; or
        a net cost for the delivery of the first item from the position of the intermodal carrier to the location;
    selecting one of the subset of the plurality of intermodal carriers based at least in part on the at least one of the net distance, the net time or the net cost for the selected one of the plurality of intermodal carriers, wherein the first intermodal carrier is the selected one of the subset of the plurality of intermodal carriers, wherein the instruction is transmitted to the first intermodal carrier in response to selecting the first intermodal carrier.

3. The distribution system of claim 1, wherein each of the intermodal carriers further comprises a steel frame having at least one automatic door at an upper surface of the steel frame and a compartment within the steel frame, and
wherein the steel frame has a height of at least nine feet, a width of approximately eight-and-one-half feet and a length of approximately fifty-three feet.

4. A method comprising:
loading a first plurality of items into a first intermodal carrier at a fulfillment center;
loading a first aerial vehicle into the first intermodal carrier at the fulfillment center;
placing the first intermodal carrier onto a well car;
coupling the first well car to a first locomotive;
causing, by the first locomotive, the first well car to travel on a first set of rails;
receiving a first order for a delivery of at least a first item to a first location by at least one computer server;
determining that the first item is one of the first plurality of items by the at least one computer server;
loading at least the first item onto the first aerial vehicle within the first intermodal carrier;
causing the first aerial vehicle to depart from the first intermodal carrier; and
causing the first aerial vehicle to execute the delivery of at least the first item to the first location.

5. The method of claim 4, wherein the first intermodal carrier comprises an intermodal container having a steel frame with a height of at least nine feet, a width of approximately eight-and-one-half feet and a length of approximately fifty-three feet.

6. The method of claim 4, wherein the first intermodal carrier further comprises:
a launch system within a compartment defined by the first intermodal carrier, wherein the launch system comprises at least one of an elevator, a pulley, a lift or a catapult, and wherein the first aerial vehicle is caused to depart from the first intermodal carrier by the launch system.

7. The method of claim 4, further comprising:
after causing the first well car to travel on the first set of rails,
determining at least one of a course or a speed of the first intermodal carrier;
selecting a departure point for the first aerial vehicle based at least in part on the at least one of the course or the speed of the first intermodal carrier;
programming the first aerial vehicle with instructions to travel from the departure point to the first location; and
determining that the first intermodal carrier is within a predetermined range of the departure point,
wherein the first aerial vehicle is caused to depart from the first intermodal carrier in response to determining that the first intermodal carrier is within the predetermined range of the departure point.

8. The method of claim 4, further comprising:
determining that the first aerial vehicle has executed the delivery of at least the first item to the first location; and
in response to determining that the first aerial vehicle has executed the delivery of at least the first item to the first location,
determining at least one of a course or a speed of the first intermodal carrier;
selecting a rendezvous point for the first aerial vehicle based at least in part on the course or the speed of the first intermodal carrier;
programming the first aerial vehicle with instructions to travel from the first location to the rendezvous point;
determining that the first intermodal carrier is at least within a predetermined range of the rendezvous point; and
in response to determining that the first intermodal carrier is at least within the predetermined range of the rendezvous point,
causing the first aerial vehicle to enter the first intermodal carrier.

9. The method of claim 4, further comprising:
receiving a second order for a delivery of a second item to a second location by the at least one computer server;
determining that the first item is one of the first plurality of items by the at least one computer server, wherein loading at least the first item onto the first aerial vehicle comprises loading the first item and the second item onto the first aerial vehicle within the first intermodal carrier;
after causing the first well car to travel on the first set of rails,
determining at least one of a course or a speed of the first intermodal carrier;
selecting a departure point for the first aerial vehicle based at least in part on the at least one of the course or the speed of the first intermodal carrier;
determining a first course and a first speed from the departure point to the first location;
determining a second course and a second speed from the first location to the second location;
after causing the first aerial vehicle to depart from the first intermodal carrier,
causing the first aerial vehicle to travel from the first departure point to the first location on at least one of the first course or the first speed;
determining that the first aerial vehicle has executed the delivery of at least the first item to the first location; and
in response to determining that the first aerial vehicle has executed the delivery of at least the first item to the first location,
causing the first aerial vehicle to travel from the first location to the second location on at least one of the second course or the second speed; and
causing the first aerial vehicle to execute the delivery of at least the second item to the second location.

10. The method of claim 4, wherein the first aerial vehicle has an operating range,
wherein at least a portion of the first set of rails is within the operating range of at least a first geographic region, and
wherein the method further comprises:
predicting, at a first time, a level of demand for the first item in the first geographic region at a second time, wherein the fulfillment center is not in the first geographic region, and wherein the second time follows the first time; and
determining a first number of the first item associated with the first level of demand in the first geographic region at the second time,
wherein the first plurality of items comprises the first number of the first item, and wherein the first plurality of items is loaded into the first intermodal carrier prior to the second time.

11. The method of claim 10, wherein predicting the level of demand for the first item in the first geographic region at the second time comprises:
prior to the first time,
determining, by the at least one computer system, at least one of:
purchases of the first item or a second item by customers in the first geographic region over a predetermined period of time, wherein the second item is one of a complement to the first item or a substitute for the first item; or
deliveries of the first item or the second item to locations in the first geographic region over the predetermined period of time,
wherein the level of demand for the first item in the first geographic region is predicted based at least in part on at least one of the prior purchases or the prior deliveries.

12. The method of claim 4, wherein the first intermodal carrier comprises:
a steel frame;
a compartment within the steel frame;
a rollable door on an upper surface of the steel frame, wherein a lower surface of the steel frame is coupled with the first well car, and wherein the first plurality of items and the first aerial vehicle are loaded into the compartment via the rollable door; and
a motorized roller disposed within the compartment, wherein the motorized roller is configured to extend or retract the rollable door,
wherein causing the first aerial vehicle to depart from the first intermodal carrier comprises:
opening, by the motorized roller, the rollable door at a first time;
determining that the first aerial vehicle has departed from the first intermodal carrier; and
in response to determining that the first aerial vehicle has departed from the first intermodal carrier, closing, by the motorized roller, the rollable door after the first time.

13. The method of claim 12, wherein placing the first intermodal carrier onto the first well car comprises:
placing a lower surface of the steel frame onto the first well car at the fulfillment center.

14. The method of claim 12, wherein placing the first intermodal carrier onto the first well car comprises:
removing the first intermodal carrier from one of a ship or a trailer; and
after removing the first intermodal carrier from the one of the ship or the trailer, placing a lower surface of the steel frame onto the first well car.

15. The method of claim 4, wherein the first intermodal carrier further comprises a compartment and a robotic arm disposed within the compartment, and
wherein loading at least the first item into the first aerial vehicle comprises:
engaging the first item by the robotic arm; and
causing at least the first item to be loaded into a cargo bay of the aerial vehicle by the robotic arm.

16. The method of claim 4, wherein determining that the first item is one of the first plurality of items comprises:
determining that the first item is within each of a plurality of intermodal carriers in motion, wherein the first intermodal carrier is one of the plurality of intermodal carriers;
determining, for each of the plurality of intermodal carriers, at least one of:
a net distance for the delivery of at least the first item to the first location;
a net time for the delivery of at least the first item to the first location; or
a net cost for the delivery of at least the first item to the first location;
selecting one of the plurality of intermodal carriers based at least in part on the at least one of the net distance, the net time or the net cost for the selected one of the plurality of intermodal carriers,
wherein the first intermodal carrier is the selected one of the plurality of intermodal carriers, and
wherein at least the first item is loaded onto the first aerial vehicle within the first intermodal carrier in response to selecting the first intermodal carrier.

17. A distribution system comprising:
a locomotive;
a well car coupled to the locomotive;
an intermodal carrier placed on the well car, wherein the intermodal carrier comprises a compartment having a plurality of items within the compartment;
a launch system within the compartment, wherein the launch system is configured to launch at least one aerial vehicle from the intermodal carrier, and wherein the launch system comprises at least one of an elevator, a pulley, a lift or a catapult;
an engagement system within the compartment, wherein the engagement system is configured to load at least one item into an aerial vehicle, wherein the engagement system comprises at least one robotic arm;
a roll-top door at an upper surface of the intermodal carrier, wherein a motorized component is configured to retract or extend the roll-top door between an open position and a closed position, and wherein the compartment is accessible with the roll-top door in the open position; and
an onboard computer system in communication with at least the launch system, the engagement system and the motorized component, wherein the onboard computer system is provided on one of the locomotive or the intermodal carrier, and
wherein the onboard computer system is also in communication with at least one external computer system not within the compartment over one or more networks.

18. The distribution system of claim 17, wherein the intermodal carrier comprises a steel frame having a lower surface resting on the well car and an upper surface comprising the roll-top door,
wherein the compartment is provided within the steel frame, and
wherein the steel frame has a height of at least nine feet, a width of approximately eight-and-one-half feet and a length of approximately fifty-three feet.

19. The distribution system of claim 17, wherein the onboard computer system is programmed with one or more sets of instructions that, when executed by the onboard computer system, cause the onboard computer system to at least:
receive, over the one or more networks, information regarding an order for a delivery of a first item to a location;
determine that the first item is one of the plurality of items;
cause, by the engagement system, the first item to be loaded onto an aerial vehicle within the compartment;

cause, by the motorized component, the roll-top door to be positioned in the open position;

program the aerial vehicle with one or more sets of instructions to travel to the location and to execute the delivery at the location; and with the first item loaded onto the aerial vehicle and the roll-top door positioned in the open position, cause, by the launch system, the aerial vehicle to depart from the intermodal carrier.

20. The distribution system of claim 19, wherein the one or more sets of instructions, when executed by the onboard computer system, further cause the onboard computer system to at least:

after receiving the information regarding the order, determine at least one of a course or a speed of the intermodal carrier; and select a departure point for the aerial vehicle based at least in part on the at least one of the course or the speed of the first intermodal carrier, wherein the aerial vehicle is caused to depart from the intermodal carrier at or near the departure point.

\* \* \* \* \*